(12) United States Patent
Wyckoff

(10) Patent No.: US 12,362,796 B2
(45) Date of Patent: Jul. 15, 2025

(54) SATELLITE COMMUNICATIONS USING SPREAD SIGNALS

(71) Applicant: Viasat, Inc., Carlsbad, CA (US)

(72) Inventor: Peter S. Wyckoff, Scottsdale, AZ (US)

(73) Assignee: Viasat, Inc., Carlsbad, CA (US)

( * ) Notice: Subject to any disclaimer, the term of this patent is extended or adjusted under 35 U.S.C. 154(b) by 336 days.

(21) Appl. No.: 17/784,348

(22) PCT Filed: Dec. 4, 2020

(86) PCT No.: PCT/US2020/063296
§ 371 (c)(1),
(2) Date: Jun. 10, 2022

(87) PCT Pub. No.: WO2021/118880
PCT Pub. Date: Jun. 17, 2021

(65) Prior Publication Data
US 2023/0050226 A1 Feb. 16, 2023

Related U.S. Application Data

(60) Provisional application No. 62/947,498, filed on Dec. 12, 2019.

(51) Int. Cl.
*H04B 7/06* (2006.01)
*H04B 7/185* (2006.01)
(Continued)

(52) U.S. Cl.
CPC ....... *H04B 7/0617* (2013.01); *H04B 7/18513* (2013.01); *H04B 7/216* (2013.01); *H04J 13/0077* (2013.01)

(58) Field of Classification Search
CPC .. H04B 7/0617; H04B 7/18513; H04B 7/216; H04J 13/0077
See application file for complete search history.

(56) References Cited

U.S. PATENT DOCUMENTS 5,608,722 A 3/1997 Miller
6,215,814 B1 4/2001 Ylitalo et al.
(Continued)

FOREIGN PATENT DOCUMENTS

CN 1770672 A 5/2006
CN 101278507 A 10/2018
WO WO2001/48944 A1 7/2001

OTHER PUBLICATIONS

Borre Kai et al., "GPS Signal", IN: "(2007) GPS Signal. In: A Software-Defined GPS and Galileo Receiver. Applied and Numerical Harmonic Analysis." Dec. 31, 2007, Birkhauser Boston., XP055787568, ISBN: 978-0-8176-4540-03.
(Continued)

*Primary Examiner* — Rahel Guarino
(74) *Attorney, Agent, or Firm* — Holland & Hart LLP

(57) ABSTRACT

Methods, systems, and devices for satellite operations are described. A satellite communications system may include a transmitter that applies multiple spreading codes to a data signal to obtain multiple spread data signals. The transmitter may transmit the multiple spread data signals from multiple antenna elements in a composite signal. The satellite communications system may also include a receiver that receives the composite signal and applies multiple despreading codes to the composite signal to obtain multiple despread data signals. The receiver may combine the multiple despread data signals to obtain a combined data signal that corresponds to the data signal processed by the transmitter. To combine the multiple despread data signals, the receiver may estimate coefficients for each of the despread data signals.

24 Claims, 8 Drawing Sheets

(51) Int. Cl.
    H04B 7/216     (2006.01)
    H04J 13/00     (2011.01)

(56) References Cited

U.S. PATENT DOCUMENTS

| | | |
|---|---|---|
| 2002/0067759 A1* | 6/2002 | Ertel .................. H01Q 3/26 |
| | | 375/141 |
| 2004/0008662 A1 | 1/2004 | Yousef et al. |
| 2006/0159160 A1 | 7/2006 | Kim et al. |
| 2007/0184849 A1* | 8/2007 | Zheng .............. H04B 7/18545 |
| | | 455/12.1 |
| 2012/0244797 A1* | 9/2012 | Corbel ............. H04B 7/18526 |
| | | 455/12.1 |
| 2014/0369320 A1 | 12/2014 | Gurvan |
| 2017/0302330 A1 | 10/2017 | Jayasimha et al. |

OTHER PUBLICATIONS

Fernandez-Prades Carles, et al., "Robust GNSS Receivers by Array Signal Processing: Theory and Implementation", Proceedings of the IEEE, IEEE. New York, US. vol. 104, No. 6, Jun. 1, 2016, pp. 1207-1220, SP011610458, ISSN: 0018-9219.

International Search Report and Written Opinion, PCT/US2020/063296 dated Jun. 14, 2021, 18 pages.

Christiano, "How Do Satellites Communication with a GPS System? A Look at the GPS Antenna" dated Jul. 25, 2018, 12 pages. https://www.allaboutcircuits.com/technical-articles/how-do-satellites-communicate-with-a-gps-system-a-look-at-the-gps-antenna/.

* cited by examiner

SATELLITE COMMUNICATIONS USING SPREAD SIGNALS

CROSS REFERENCE

The present Application for Patent is a 371 national phase filing of International Patent Application No. PCT/US2020/063296 by WYCOFF, entitled "SATELLITE COMMUNICATIONS USING SPREAD SIGNALS" filed Dec. 4, 2020, which claims the benefit of U.S. Provisional Patent Application No. 62/947,498 by WYCOFF, entitled "SATELLITE COMMUNICATIONS USING SPREAD SIGNALS," filed Dec. 12, 2019, each of which is assigned to the assignee hereof and each of which is expressly incorporated by reference in its entirety herein.

BACKGROUND

The following relates generally to satellite communications and more specifically to satellite communications using spread or wide coverage signals.

A portion of wireless spectrum (e.g., one or more frequency bands) may be used by a satellite communications system to perform wireless communications. A satellite communications system may use communication techniques that increase a throughput of the wireless communications system by increasing a utilization of the portion of the wireless spectrum available to the satellite communications system. In some examples, the communication techniques enable the satellite communications system to serve the same quantity of user terminals at an increased data rate, an additional quantity of users at a same data rate, or an additional quantity of user terminals at an increased data rate. Some communication techniques may divide (e.g., in time and/or frequency) the wireless spectrum into discrete communication resources that are used to transmit to individual user terminals. Other communication techniques may enable multiple communications for multiple user terminals to be transmitted over a same set of communication resources (e.g., such communication techniques may be referred to as spreading). Additional communication techniques may enable the portion of the wireless spectrum to be reused in different geographic regions of a geographic area serviced by a satellite (e.g., such communication techniques may be referred to as beamforming).

SUMMARY

The described techniques relate to improved methods, systems, devices, and apparatuses that support satellite communications using spread or wide coverage signals. A satellite communications system may use an enhanced communication technique that involves applying multiple sequences to a data signal to obtain multiple spread signals and transmitting the spread signals over multiple antenna elements having wide native beam patterns. This enhanced communication technique may be referred to as "feed-specific spreading." In some examples, to perform feed-specific spreading, a satellite communications system may include multiple signal spreaders that are each coupled with one or more antenna elements via one or more power amplifiers. In some examples, each signal spreader may apply a different sequence (e.g., a pseudorandom sequence or orthogonal code) to a common data signal to obtain multiple spread signals, where the common signal may include data for a single user terminal. The signal spreaders may then pass the multiple spread signals to a set of antenna elements, which may, together, emit a combined signal that includes the spread signals across a service area of a satellite.

A user terminal having an unknown location within the service area of the satellite may receive the combined signal—e.g., during an interval for spread communications. The receiving device may apply a set of sequences (e.g., pseudorandom sequences or orthogonal codes) to the received combined signal to obtain multiple despread signals, where the set of sequences may be the same as or based on the set of sequences used to transmit the combined signal. The receiving device may then process and combine the multiple despread signals to obtain a data signal that may be demodulated and decoded, where the data signal may have a higher SNR than any of the individual despread signals. In some examples, the SNR of the data signal may be proportionate to the quantity of spread signals included in the combined signal. By using enhanced spreading, mission-sensitive user terminals may be serviced without compromising the security of the user terminals. In some examples, the increase in SNR provided by the enhanced spread communication may be used to support communications with user terminals that have a known location but are unable to reliably communicate with a satellite—e.g., based on having an inadequate antenna or being located in a dead zone. Such user terminals may similarly be scheduled to receive a combined signal—e.g., during an interval for spread communications. In some examples, feed-specific spreading may be offered as a premium service to user terminals that have a valid subscription—e.g., disadvantaged user terminals, security-conscious user terminals, etc.

DETAILED DESCRIPTION

Figure 1:
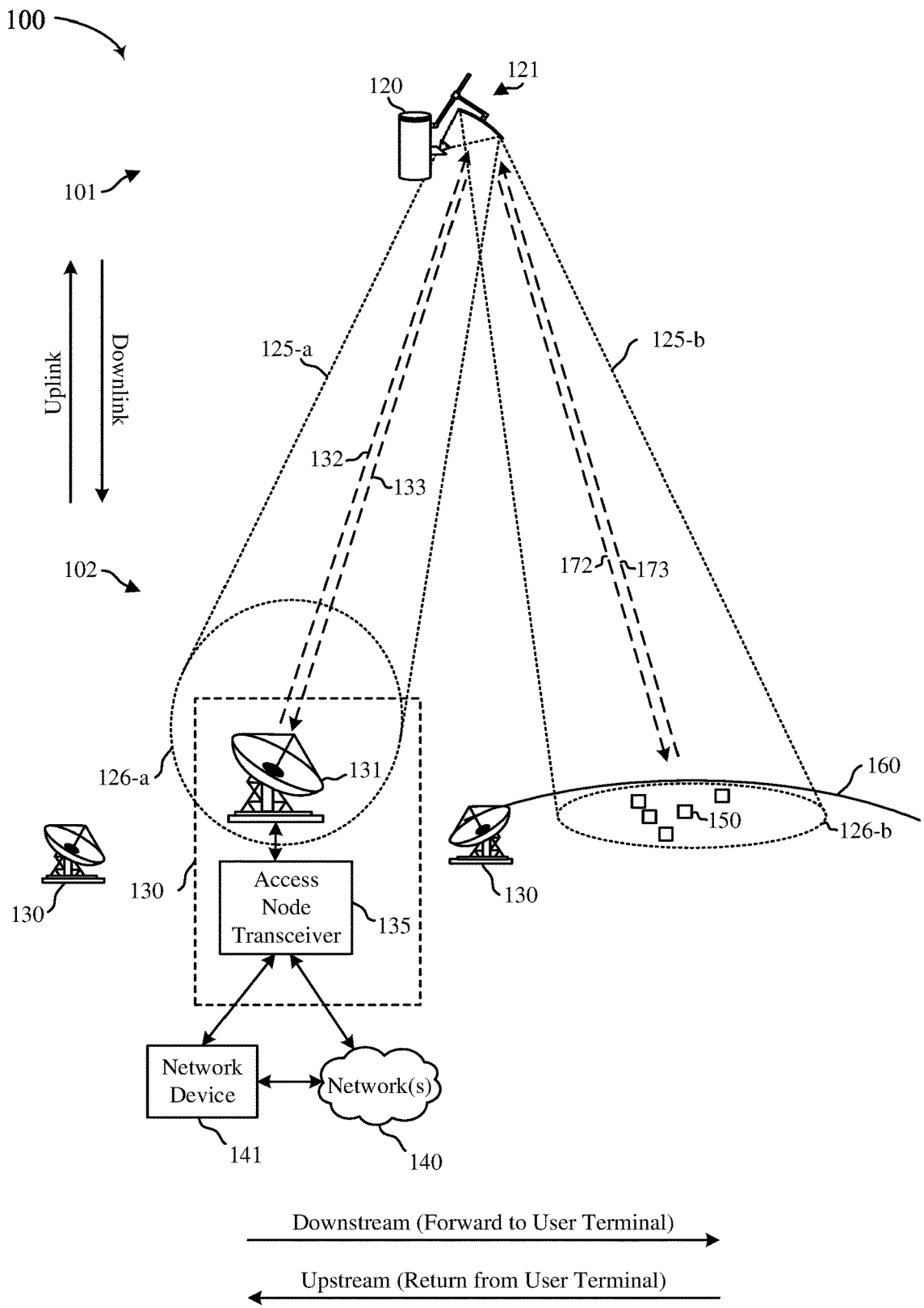
FIG. 1 shows a diagram of a communications system that supports satellite communications using spread or wide coverage signals in accordance with examples as disclosed herein.

Data may be communicated between access node terminals and user terminals in one or more beams. In some examples, a satellite (e.g., a broadcasting satellite) may use a single broad beam to communicate data (e.g., common data) to user terminals located within a service area of the satellite. In such cases, the satellite may include a single feed that is coupled with a single antenna, where the energy of a signal transmitted from the antenna may be spread across the service area of the satellite. Satellite communications systems that use a single broad beam may be referred to as single beam systems. In other examples, a satellite (e.g., a communications satellite) may use multiple narrow beams (or "spot beams") to communicate data to user terminals located within a service area of the satellite. Satellite communications systems that use multiple spot beams may be referred to as spot beam systems. Spot beam systems may spatially divide the service area of a satellite into geographic regions, where each geographic region may be covered by a spot beam. And each spot beam may be allocated a portion of the communication resources (e.g., bandwidth, polarizations).

In a spot beam system, a satellite (e.g., a communications satellite) may use multiple broad beams to form spot beams within a service area of the satellite. In such cases, a satellite may include an antenna assembly that includes multiple antenna elements, where each antenna element may have a native broad beam pattern. To form the spot beams, beam weights may be applied (e.g., using phase shifters and amplitude adjusters) to signals transmitted over a set of the antenna elements such that the signals transmitted from the set of antenna elements constructively and destructively combine, focusing the energy of the resulting signal within a sub-region of the service area. For a dynamic spot beam system, the size of the spot beams formed by the satellite may be based on the beam weights used to form the spot beams. In some examples, communications transmitted using a spot beam may have higher data rates and provide preferred signal characteristics (e.g., a higher signal-to-noise ratio (SNR)) than communications transmitted using a broad beam. In some examples, using multiple antenna elements to form a spot beam may be referred to as beamforming, a satellite transmission system that supports using multiple antenna elements to form a spot beam may be configured in accordance with a beamforming architecture, and information that is transmitted using multiple antenna elements may be referred to as beamformed communications.

Different communication techniques may be used to communicate data within a beam (e.g., a broad beam or a spot beam). Some of these communication techniques may involve sharing the communication resources within a beam among the user terminals included in the service area. To support multiple user terminals within a beam, communication resources may be divided (e.g., in time and frequency) among the user terminals. That is, each user terminal may be allocated unique communication resources over which a transmission for a respective user terminal may be transmitted (e.g., using time-division multiple access (TDMA) techniques, frequency-division multiple access (FDMA) techniques, or any combination thereof). Additionally, or alternatively, user terminals may be scheduled to use common time and frequency resources. That is, multiple user terminals many be allocated a same set of communication resources, and transmissions for the user terminals may be spread across the communication resources (e.g., in time and/or frequency) using unique patterns that enable the transmissions to be separated at a user terminal. Spreading techniques may include frequency-hopping spread spectrum, time-hopping spread spectrum, or direct-sequence spread spectrum (DSSS) techniques. DSSS techniques may involve applying a sequence (e.g., pseudorandom sequences or orthogonal code) to a data signal before transmission of the data signal. To support communications to multiple user terminals using DSSS, unique sequences may be applied to data signals that are intended for different user terminals before the data signals are simultaneously transmitted over a same set of communication resources. Applying unique sequences to data signals intended for different users prior to transmission may be an example of a code division multiple access (CDMA) technique.

In some examples, a satellite communications system may determine location information for a user terminal before performing beamformed communications to the user terminal in a spot beam—so that the transmitting device may identify, for the transmission, a spot beam that has a coverage area that encompasses the user terminal. For example, the user terminal may be a fixed terminal in a known location, or a mobility of the user terminal may be tracked to determine how to transition (e.g., hand-off) the user terminal from one spot beam to another. However, in some examples, a location of a user terminal may be unknown to a satellite communications system (e.g., to a controller allocating resources of the satellite communication system to various user terminals). In some examples, the location of the user terminal is intentionally withheld from the satellite communications system by the user terminal. Additionally, or alternatively, intentional measures may be taken by a user terminal to prevent the satellite communications system from determining a location of the user terminal. In such cases, a satellite communications system that uses spot beams may be unable to transmit to the user terminal—e.g., because the satellite communications system may be unable to determine a spot beam in which the user terminal is located. In some examples, even when a location of a user terminal is known, an SNR of signals received at the user terminal may be below a threshold associated with reliably communicating with the user terminal. In some examples, the SNR for the signals is below the threshold when the user terminal has an insufficient (e.g., small) antenna or is located in a poor coverage zone—such user terminals may be referred to as disadvantaged user terminals.

To support communications with user terminals having unknown locations (and disadvantaged user terminals having known or unknown locations), a satellite communications system that supports dynamic spot beam forming may use an enhanced communication technique that involves applying multiple sequences to a data signal to obtain multiple spread signals and transmitting the spread signals over multiple antenna elements having wide native beam patterns. This enhanced communication technique may be referred to as "enhanced spreading" or "feed-specific spreading." In some examples, to perform feed-specific spreading, a satellite communications system may include multiple phase shifters and multiple signal spreaders that are each coupled with one or more antenna elements via one or more power amplifiers. In some examples, each signal spreader may apply a different sequence (e.g., a pseudorandom sequence or orthogonal code) to a common data signal to obtain multiple spread signals, where the common signal may include data for a single user terminal. The signal spreaders may then pass the multiple spread signals to a set of antenna elements, which may, together, emit a combined signal that includes the spread signals across a service area of a satellite. In contrast to the correlated signals transmitted from the antenna elements for beamforming, the spread signals emitted from the antenna elements may be uncorrelated because of the spreading sequences. Thus, they may neither constructively nor destructively combine, and may thus result in independent broad beams without forming spot beams.

A user terminal having an unknown location within the service area of the satellite may receive the combined signal—e.g., during an interval for spread communications. The receiving device may apply a set of sequences (e.g., pseudorandom sequences or orthogonal codes) to the received combined signal to obtain multiple despread signals, where the set of sequences may be the same as or based on the set of sequences used to transmit the combined signal. The receiving device may then process and combine the multiple despread signals to obtain a data signal that may be demodulated and decoded, where the data signal may have a higher SNR than any of the individual despread signals. That is, the receiving device may coherently add the spread signals received at the receiving device to obtain a combined signal having an improved SNR. In some examples, the SNR of the data signal may be proportionate to the quantity of spread signals included in the combined signal. By using enhanced spreading, mission-sensitive user terminals may be serviced without compromising the security of the user terminals. In some examples, the increase in SNR provided by the enhanced spread communication may be used to support communications with user terminals that have a known location but are unable to reliably communicate with a satellite—e.g., based on having an inadequate antenna or being located in a dead zone. Such user terminals may similarly be scheduled to receive a combined signal—e.g., during an interval for spread communications. In some examples, feed-specific spreading may be offered as a premium service to user terminals that have a valid subscription—e.g., disadvantaged user terminals, security-conscious user terminals, etc.

In some examples, to support communications both with user terminals having a known location or user terminals having an unknown location without significantly impacting a performance of a satellite communications system, a satellite communications system may switch between beamforming and feed-specific spreading. In some examples, the satellite communications system may transmit to user terminals having a known location using beamforming during a first interval and to user terminals having an unknown location using feed-specific spreading during a second interval. In some examples, a throughput of the satellite communications system may be greater during the first interval than the second interval, and the first interval may be longer than the second interval.

This description provides various examples of techniques for satellite communications using spread or wide coverage signals, and such examples are not a limitation of the scope, applicability, or configuration of examples in accordance with the principles described herein. Rather, the ensuing description will provide those skilled in the art with an enabling description for implementing embodiments of the principles described herein. Various changes may be made in the function and arrangement of elements.

Thus, various embodiments in accordance with the examples disclosed herein may omit, substitute, or add various procedures or components as appropriate. For instance, it should be appreciated that the methods may be performed in an order different than that described, and that various steps may be added, omitted or combined. Also, aspects and elements described with respect to certain examples may be combined in various other examples. It should also be appreciated that the following systems, methods, devices, and software may individually or collectively be components of a larger system, wherein other procedures may take precedence over or otherwise modify their application.

FIG. 1 shows a diagram of a communications system that supports satellite communications using spread or wide coverage signals in accordance with examples as disclosed herein. Communications system 100 may use a number of network architectures including a space segment 101 and ground segment 102. The space segment 101 may include one or more satellites 120. The ground segment 102 may include one or more access node terminals 130 (e.g., gateway terminals, ground stations), as well as network devices 141 such as network operations centers (NOCs), satellite and gateway terminal command centers, or other central processing centers or devices. Network device(s) 141 may be coupled with the access node terminal 130 and may control aspects of the communications system 100. In various examples a network device 141 may be co-located or otherwise nearby the access node terminal 130 or may be a remote installation that communicates with the access node terminal 130 and/or network(s) 140 via wired and/or wireless communications link(s). In some examples, the ground segment 102 may also include user terminals 150 that are provided a communications service via a satellite 120.

User terminals 150 may include various devices configured to communicate signals with the satellite 120, which may include fixed terminals (e.g., ground-based stationary terminals) or mobile terminals such as terminals on boats, aircraft, ground-based vehicles, and the like. A user terminal 150 may communicate data and information with an access node terminal 130 via the satellite 120. The data and information may be communicated with a destination device such as a network device 141, or some other device or distributed server associated with a network 140.

An access node terminal 130 may transmit forward uplink signals 132 to satellite 120 and receive return downlink signals 133 from satellite 120. Access node terminals 130 may also be known as ground stations, gateways, gateway terminals, or hubs. An access node terminal 130 may include an access node terminal antenna system 131 and an access node terminal transceiver 135. The access node terminal antenna system 131 may be two-way capable and designed with adequate transmit power and receive sensitivity to communicate reliably with the satellite 120. In some examples, access node terminal antenna system 131 may comprise a parabolic reflector with high directivity in the direction of a satellite 120 and low directivity in other directions. Access node terminal antenna system 131 may comprise a variety of alternative configurations and include operating features such as high isolation between orthogonal polarizations, high efficiency in the operational frequency bands, low noise, and the like.

When supporting a communications service, an access node terminal 130 may schedule traffic to user terminals 150. Alternatively, such scheduling may be performed in other parts of a communications system 100 (e.g., at one or more network devices 141, which may include network operations centers (NOC) and/or gateway command centers). Although one access node terminal 130 is shown in FIG. 1, examples in accordance with the present disclosure may be implemented in communications systems having a plurality of access node terminals 130, each of which may be coupled to each other and/or one or more networks 140.

An access node terminal 130 may provide an interface between the network 140 and the satellite 120 and, in some examples, may be configured to receive data and information directed between the network 140 and one or more user terminals 150. Access node terminal 130 may format the data and information for delivery to respective user terminals 150. Similarly, access node terminal 130 may be configured to receive signals from the satellite 120 (e.g., from one or more user terminals 150) directed to a destination accessible via network 140. Access node terminal 130 may also format the received signals for transmission on network 140.

The network(s) 140 may be any type of network and can include, for example, the Internet, an internet protocol (IP) network, an intranet, a wide-area network (WAN), a metropolitan area network (MAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting communications between devices as described herein. Network(s) 140 may include both wired and wireless connections as well as optical links. Network(s) 140 may connect the access node terminal 130 with other access node terminals that may be in communication with the same satellite 120 or with different satellites 120 or other vehicles.

A satellite 120 may be configured to support wireless communications between one or more access node terminals 130 and/or various user terminals 150 located in a service coverage area. In some examples, the satellite 120 may be deployed in a geostationary orbit, such that its orbital position with respect to terrestrial devices is relatively fixed or fixed within an operational tolerance or other orbital window (e.g., within an orbital slot). In other examples, the satellite 120 may operate in any appropriate orbit (e.g., low Earth orbit (LEO), medium Earth orbit (MEO), etc.).

The satellite 120 may include an antenna assembly 121 having one or more antenna feed elements. Each of the antenna feed elements may include, for example, a feed horn, a polarization transducer (e.g., a septum polarized horn, which may function as two combined elements with different polarizations), a multi-port multi-band horn (e.g., dual-band 20 GHz/30 GHz with dual polarization LHCP/RHCP), a cavity-backed slot, an inverted-F, a slotted waveguide, a Vivaldi, a Helical, a loop, a patch, or any other configuration of an antenna element or combination of interconnected sub-elements. Each of the antenna feed elements may also include, or be otherwise coupled with, a radio frequency (RF) signal transducer, a low noise amplifier (LNA), or power amplifier (PA), and may be coupled with one or more transponders in the satellite 120. The transponders may be used to perform signal processing, such as amplification, frequency conversion, beamforming, and the like.

In some embodiments, a Multi-Frequency Time-Division Multiple Access (MF-TDMA) scheme may be used for forward uplink signals 132 and return uplink signals 173, allowing efficient streaming of traffic while maintaining flexibility in allocating capacity among user terminals 150. In these embodiments, a number of frequency channels may be allocated in a fixed manner or, alternatively, may be allocated in a dynamic fashion. A Time Division Multiple Access (TDMA) scheme may also be employed in each frequency channel. In this scheme, each frequency channel may be divided into several timeslots that can be assigned to a connection (e.g., to a particular user terminal 150). In other embodiments, one or more of the forward uplink signals 132 and return uplink signals 173 may be configured using other schemes, such as Frequency Division Multiple Access (FDMA), Orthogonal Frequency Division Multiple Access (OFDMA), Code Division Multiple Access (CDMA), or any number of hybrid or other schemes known in the art. In various embodiments, physical layer techniques may be the same for each of forward uplink signals 132, return downlink signals 133, forward downlink signals 172, or return uplink signals 173, or some of the signals may use different physical layer techniques than other signals.

When supporting a communications service, the satellite 120 may receive forward uplink signals 132 from one or more access node terminals 130 and provide corresponding forward downlink signals 172 to one or more user terminals 150. The satellite 120 may also receive return uplink signals 173 from one or more user terminals 150 and provide corresponding return downlink signals 133 to one or more access node terminals 130. A variety of physical layer transmission modulation and coding techniques may be used by access node terminals 130, satellite 120, and user terminals 150 for the communication of signals (e.g., adaptive coding and modulation (ACM)). A satellite 120 may include one or more transponders that may each be coupled with one or more receive elements and one or more transmit antenna elements of an antenna, forming K receive/transmit paths having different radiation patterns (e.g., by using different frequency range and polarization combinations). Each of the K receive/transmit paths may be allocated as a forward pathway or a return pathway at any instant of time.

In some examples, a satellite 120 may communicate data using a single beam for communicating with an access node terminal 130 (which may be referred to as an access node beam) and a single beam for communicating with a user terminal 150 (which may be referred to as a user beam). In some examples, each of these beams covers a service area of the satellite 120, which may span a large geographic area (e.g., a half of the earth). In such cases, the access node beam and user beam may be referred to as broad beams. Also, the communication resources (e.g., time and/or frequency resources) allocated to the communications system 100 may be shared among the user terminals 150 within the coverage area of user beam 125-b. In some examples, the communication resource may be divided among the user terminals 150 in time and/or frequency, and separate communications may be transmitted to the user terminals 150 over different communication resources. Additionally, or alternatively, multiple user terminals 150 may use the same time and frequency resources, and separate communications may be transmitted to the user terminals 150 over the same communication resources. When multiple user terminals 150 use the same time and frequency resources, a satellite communications system may apply spreading to the separate communications prior to transmission. For example, sequences (e.g., pseudorandom sequences or orthogonal code) may be applied to the separate communications before the separate communications are transmitted in a combined signal over the same time and frequency resources.

In some examples, each sequence may be assigned to a different user terminal 150. Communications that are spread using a sequence may be referred to as DSSS communications, and simultaneously transmitting transmissions for different users that have been spread using unique sequence may be an example of a CDMA technique. A user terminal 150 may determine a sequence used for communications to the user terminal 150, and apply the sequence to the combined signal to extract a component of the signal that carries a communication intended for the user terminal 150. A satellite 120 that performs CDMA communications may include multiple spreaders and one or more power amplifiers that are coupled with the spreaders and antenna elements of an antenna array. In some examples, separate data signals may be provided to respective spreaders, which may apply unique spreading codes to the data signals to obtain multiple spread signals. The spread signals may be combined and provided to one or more power amplifiers, which may provide an amplified signal to an antenna of the satellite 120.

In other examples, a satellite 120 may communicate data using multiple beams that cover a service area of the satellite 120—e.g., to increase a capacity of a communications system. That is, the satellite 120 may communicate data using multiple beams that are arrayed or tiled to cover a service area of the satellite 120. Some satellites 120 may include several transponders, each able to independently receive and transmit signals. Each transponder may be coupled to one or more antenna elements (e.g., a receive element and a transmit antenna element) to form a receive/transmit signal path that has a different radiation pattern (antenna pattern) from the other receive/transmit signal paths to create unique beams that may be allocated to the same (e.g., using different frequency ranges or polarizations) or different beam coverage areas. In some cases, a single receive/transmit signal path may be shared across multiple beams using input and/or output multiplexers. In such cases, the number of simultaneous beams that may be formed may generally be limited by the number of receive/transmit signal paths deployed on the satellite.

In some examples, access node terminal beams or user beams may be obtained via beamforming (and may be referred to as "spot beams"). In such cases, access node beam 125-a may be one of multiple access node terminal beams that cover a service area of the satellite 120. Similarly, user beam 125-b may be one of multiple user node beams that cover a service area of the satellite 120. Beamforming for a communication link may be performed by adjusting the signal phase (or time delay), and sometimes signal amplitude, of signals transmitted and/or received by multiple elements of one or more antenna arrays. This phase/amplitude adjustment is commonly referred to as applying "beam weights" or "beam coefficients" to the transmitted signals. For reception (by receive elements of the one or more antenna arrays), the relative phases, and sometimes amplitudes, of the received signals are adjusted (e.g., the same or different beam weights are applied) so that the energy received from a desired location by multiple receive antenna elements will constructively superpose. Within a spot beam, communication resources may be divided amongst user terminals, as similarly describe with reference to communications using broad beams. Also, in some examples, a same set of communications resources may be shared by user terminals, as similarly described with reference to communications using broad beams.

The satellite 120 may communicate with an access node terminal 130 by transmitting return downlink signals 133 and/or receiving forward uplink signals 132 via one or more access node terminal beams (e.g., access node beam 125-a, which may be associated with a respective access node beam coverage area 126-a). Access node beam 125-a may, for example, support a communications service for one or more user terminals 150 (e.g., relayed by the satellite 120), or any other communications between the satellite 120 and the access node terminal 130. In some examples, access node beam 125-a is one of multiple spot beams. The satellite 120 may communicate with a user terminal 150 by transmitting forward downlink signals 172 and/or receiving return uplink signals 173 via one or more user beams (e.g., user beam 125-b, which may be associated with a respective user beam coverage area 126-b). User beam 125-b may support a communications service for one or more user terminals 150 or any other communications between the satellite 120 and the user terminal 150. In some examples, user beam 125-b is one of multiple spot beams. In some examples, the satellite 120 may relay communications from an access node terminal 130 to user terminals 150 using one of the access node beam 125-a or the user beam 125-b (that is, access node terminals 130 and user terminals 150 may share a beam).

To support beamforming operations, the satellite 120 may use a phased array antenna assembly (e.g., direct radiating array (DRA)), a phased array fed reflector (PAFR) antenna, or any other mechanism known in the art for reception or transmission of signals (e.g., of a communications or broadcast service, or a data collection service). Phased array antenna assemblies may be employed for both receiving uplink signals (e.g., forward uplink signal 132, return uplink signal 173, or both) and transmitting downlink signals (e.g., return downlink signal 133, forward downlink signal 172, or both). Relatively large reflectors may be illuminated by a phased array of antenna feed elements, supporting an ability to make various patterns of spot beams within the constraints set by the size of the reflector and the number and placement of the antenna feed elements.

Each of the antenna feed elements may also include, or be otherwise coupled with an RF signal transducer, an LNA, a phase shifter, or PA, and may be coupled with one or more transponders in the satellite 120 that may perform other signal processing such as frequency conversion, beamforming processing, and the like. In some examples, each phase shifter may be coupled with one or more power amplifiers, and each power amplifier may be coupled with one or more antenna elements. In some examples, the phase shifters and/or weighting amplifiers may be located at the access node terminal 130. Communications for different user terminals 150 may be provided to a set of phase shifters that generates a set of phase-shifted signals and provides the set of phase-shifted signals to a set of amplifiers. The set of amplifiers may amplify the phase-shifted signals (e.g., with different degrees of amplitude) to obtain weighed signals and provide the weighted signals to a set of antenna elements. When emitted by the set of antenna elements, the weighted signals may constructively and/or destructively combine so that the weighted signals form a single signal that is focused on a geographic region of a larger geographic area serviced by the satellite 120. A transponder that is coupled with multiple antenna feed elements may be capable of performing beamformed communications.

In some examples, some or all antenna feed elements may be arranged as an array of constituent receive and/or transmit antenna feed elements that cooperate to enable various examples of beamforming, such as ground-based beamforming (GBBF), on-board beamforming (OBBF), end-to-end (E2E) beamforming, or other types of beamforming. For OBBF, the satellite 120 may include Ni transmitters and an NixKi beam weight matrix may be used to generate $K_1$ user beams. Similarly, for GBBF, the satellite 120 may include $N_1$ transmitters and receive $N_1$ signals corresponding to respective transmitters in the satellite (e.g., frequency division multiplexed) from one or more access node terminals. The one or more access node terminals may apply an $N_1 \times K_1$ beam weight matrix to generate $K_1$ user beams. For E2E beamforming, the satellite 120 may include $N_1$ transponders. The $N_1$ transponders may be used to receive signals from M access node terminals, where the received signals may be weighted (e.g., weighting each of $K_1$ beam signals for respective sets of one or more access node terminals) before transmission by the access node terminals to support beamforming for $K_1$ user beams. It should be noted that the present examples describe the forward link, while similar arrangements may be made for the return link. Regardless of the beamforming technique used, in order to communicate data to a user terminal 150, the access node terminal 130, and/or the satellite 120 may determine a location of the user terminal 150—e.g., so that the data can be transmitted over a beam (e.g. user beam 125-*b*) having a coverage area that encompasses the user terminal 150.

In some examples, beamforming enables a satellite 120 to communicate more data than if a single broad beam were used—e.g. because beamformed communications enable the available frequency resources (e.g., satellite bandwidth) to be reused in multiple geographic regions within a larger geographic area serviced by the satellite 120. That is, a given set of frequency resources may be reused in non-overlapping geographic regions. In some examples, the satellite 120 may increase the amount of data that may be communicated as a function of the number of geographic regions. In some examples, a satellite 120 using beamforming techniques may communicate data at a data rate of 100 Megasymbols (Msym) per second (Msym/sec), while a satellite 120 using a single broad beam and DSSS techniques may communicate data at a data rate of 1 Msym/sec. Additionally, beamforming may enable a satellite 120 to increase an SNR for communications between the satellite 120 and user terminals 150 relative to DSSS communication techniques—e.g., because the transmission power used to transmit a beam signal may be concentrated in the transmission beam, rather than spread across a service area of the satellite 120. Thus, beamformed communications may be more reliable than non-beamformed (e.g., broad beam) communications where the transmission power for a communication is spread across the geographic area.

In some examples, a location of a user terminal may be unknown to a satellite communications system (e.g., to a controller allocating resources of the satellite communication system to various user terminals). In some examples, the location of the user terminal is intentionally withheld from the satellite communications system by the user terminal. Additionally, or alternatively, intentional measures may be taken by a user terminal to prevent the satellite communications system from determining a location of the user terminal. In such cases, a satellite communications system that uses spot beams may be unable to transmit to the user terminal—e.g., because the satellite communications system may be unable to determine a spot beam in which the user terminal is located. In some examples, even when a location of a user terminal is known, an SNR of signals received at the user terminal may be below a threshold associated with reliably communicating with the user terminal. In some examples, the SNR for the signals is below the threshold when the user terminal has an insufficient (e.g., small) antenna or is located in a poor coverage zone—such user terminals may be referred to as disadvantaged user terminals.

In some examples, regardless of whether beamforming or broad beam techniques are used, an SNR of signals received at a user terminal having a known location may be below a threshold associated with reliably communicating with the user terminal. In some examples, the SNR for the signals is below the threshold when the user terminal has an insufficient (e.g., small) antenna or is located in a poor coverage zone—such user terminals may be referred to as disadvantaged user terminals.

To support communications with user terminals having unknown locations (and disadvantaged user terminals having known or unknown locations), a satellite communications system that supports dynamic spot beam forming may use an enhanced communication technique that involves applying multiple sequences to a data signal to obtain multiple spread signals and transmitting the spread signals over multiple antenna elements having wide native beam patterns. This enhanced communication technique may be referred to as "feed-specific spreading." In some examples, to perform feed-specific spreading, a satellite communications system may include multiple phase shifters and multiple signal spreaders that are each coupled with one or more antenna elements via one or more power amplifiers. In some examples, each signal spreader may apply a different sequence (e.g., a pseudorandom sequence or orthogonal code) to a common data signal to obtain multiple spread signals, where the common signal may include data for a single user terminal. The signal spreaders may then pass the multiple spread signals to a set of antenna elements, which may, together, emit a combined signal that includes the spread signals across a service area of a satellite.

A user terminal having an unknown location within the service area of the satellite may receive the combined signal—e.g., during an interval for spread communications. The receiving device may apply a set of sequences (e.g., pseudorandom sequences or orthogonal codes) to the received combined signal to obtain multiple despread signals, where the set of sequences may be the same as or based on the set of sequences used to transmit the combined signal. The receiving device may then process and combine the multiple despread signals to obtain a data signal that may be demodulated and decoded, where the data signal may have a higher SNR than any of the individual despread signals. In some examples, the SNR of the data signal may be proportionate to the quantity of spread signals included in the combined signal. By using enhanced spreading, mission-sensitive user terminals may be serviced without compromising the security of the user terminals. In some examples, the increase in SNR provided by the enhanced spread communication may be used to support communications with user terminals that have a known location but are unable to reliably communicate with a satellite—e.g., based on having an inadequate antenna or being located in a dead zone. Such user terminals may similarly be scheduled to receive a combined signal—e.g., during an interval for spread communications. In some examples, feed-specific spreading may be offered as a premium service to user terminals that have a valid subscription—e.g., disadvantaged user terminals, security-conscious user terminals, etc.

In some examples, to support communications both with user terminals having a known location or user terminals having an unknown location without significantly impacting a performance of a satellite communications system, a satellite communications system may switch between beamforming and feed-specific spreading. In some examples, the satellite communications system may transmit to user terminals having a known location using beamforming during a first interval and to user terminals having an unknown location using feed-specific spreading during a second interval. In some examples, a throughput of the satellite communications system may be greater during the first interval than the second interval, and the first interval may be longer than the second interval.

Figure 2:
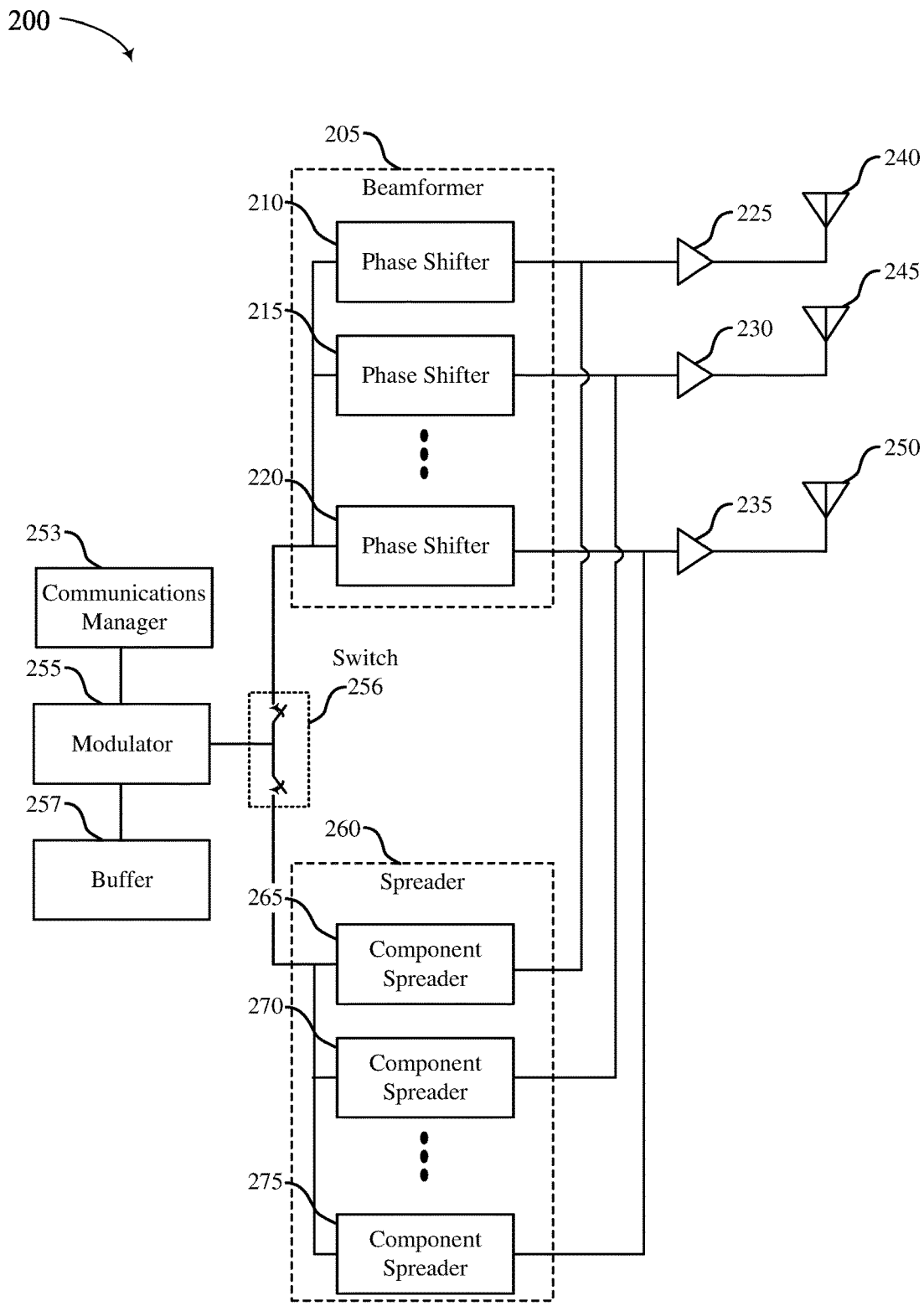
FIG. 2 shows a transmission system that supports satellite communications using spread or wide coverage signals in accordance with examples as disclosed herein.

FIG. 2 shows a transmission system that supports satellite communications using spread or wide coverage signals in accordance with examples as disclosed herein. Transmission system 200 may be configured to transmit communication signals (e.g., data/control signals) to a user terminal. Transmission system 200 may be further configured to switch between beamforming and spreading modes to communicate with different types of user terminals—e.g., user terminals with a known location and user terminals with an unknown location, respectively. In some examples, transmission system 200 switches between the beamforming and spreading modes in accordance with a schedule—e.g., transmitting beamformed communications during a first interval that includes a first quantity of communication slots and spread communications during a second interval that includes a second quantity of communication slots.

When the beamforming mode is configured, transmission system 200 may be configured to use beamformer 205 to separate a data signal for a user terminal into multiple data signals and apply phase shifts and/or modify a magnitude of each of the multiple data signals so that the transmitted data signal is transmitted in a spot beam the encompasses the user terminal. Beamformer 205 may include multiple phase shifters (e.g., first phase shifter 210, second phase shifter 215, and nth phase shifter 220), and may also vary amplitudes of each signal transmitted from antenna elements (e.g., first antenna element 240, second antenna element 245, and nth antenna element 250) via power amplifiers (e.g., first power amplifier 225, second power amplifier 230, and nth power amplifier 235).

When the spreading mode is configured, transmission system 200 may be configured to use spreader 260 to separate a data signal for a user terminal into multiple data signals and apply unique sequences (e.g., pseudorandom sequences or orthogonal codes) to each of the multiple data signals so that the transmitted data signal is transmitted in a broad beam that spans an entire service area of a satellite or multiple spot beams, for example. Spreader 260 may include multiple component spreaders (e.g., first component spreader 265, second component spreader 270, and nth component spreader 275).

In some examples, transmission system 200 may be included in a single device (e.g., in a satellite or access node terminal). In other examples, transmission system 200 is split across multiple devices (e.g., across a satellite and access node terminal or across a satellite and multiple access node terminals). For example, if on-board beamforming is used, at least beamformer 205, spreader 260, the power amplifiers, and the antennas may be included at a satellite. Communications manager 253, modulator 255, and buffer 257 may be included at an access node terminal or the satellite. In another example, if ground-based beamforming is used, communications manager 253, modulator 255, buffer 257, beamformer 205, and spreader 260 may be included at an access node terminal, while the power amplifiers and antennas may be included at a satellite. In such cases, the satellite may include transponders that are used to relay signals received from the access node terminal. In yet another example, if end-to-end beamforming is used, the components of beamformer 205 and spreader 260 may be distributed across multiple access node terminals, each access node terminal including one or more phase shifters and one or more component spreaders. Communications manager 253, modulator 255, and buffer 257 may be located at a central device that is coupled with the multiple access node terminals. And the amplifiers and antennas may be included at the satellite. In such cases, the satellite may include transponders that are used to relay signals received from the access node terminal.

Communications manager 253 may be configured to switch between the beamforming and spreading modes. Communications manager 253 may indicate to modulator 255 whether the beamforming or spreading mode is activated. In some examples, communications manager 253 may switch between the beamforming and spreading modes in accordance with a communication schedule, where communications manager 253 may activate the beamforming mode during a first interval and the spreading mode during a second interval. When beamforming is enabled, communications manager 253 may also determine and provide a location of a user terminal to other components within transmission system 200. In some examples, communications manager 253 may identify a user beam that has a coverage area that encompasses a location of the user terminal and assign data for the user terminal to a data stream that is associated with the user beam.

Switch 256 may be configured to control a data path from modulator 255 to beamformer 205 and spreader 260. In some examples, communications manager 253 is configured to control switch 256 based on whether the beamforming mode or the spreading mode is configured. For example, communications manager 253 may open the switch that connects modulator 255 and beamformer 205 and close the switch that connects modulator 255 and spreader 260 when the spreading is activated.

Modulator 255 may be configured to modulate a data stream (e.g., a stream of binary values) to obtain a data signal that includes data symbols. Modulator 255 may be configured to modulate the data stream in accordance with one or more modulation techniques and/or coding rates. In some examples, modulator 255 uses a first modulation and coding scheme when beamformer 205 is used and a second modulation and coding scheme when spreader 260 is used—e.g., when spreader 260 is used, modulator 255 may use a modulation and coding scheme with a higher modulation order. Modulator 255 may provide a modulated signal to one of beamformer 205 or spreader 260—e.g., based on whether a beamforming or spreading mode is enabled. In some cases, modulator 255 may generate multiple data streams for each user beam, and beamformer 205 may apply respective coefficients (e.g., beam weights) to each of the data stream to obtain multiple phase-shifted signals. Accordingly, the multiple data streams may be transmitted in respective beams formed by applying the respective coefficients and combining the multiple phase-shifted signals.

In some examples, transmission system 200 includes multiple modulators. For example, transmission system 200 may include modulator 255 and a second modulator. In such cases, modulator 255 may be coupled with one of beamformer 205 and spreader 260, while the other modulator may be coupled with the other of beamformer 205 and spreader 250. Additionally, or alternatively, modulator 255 may be coupled with a first subset of component spreaders 265 while the other modulator may be coupled with a second subset of component spreaders 265. Communications manager 256 may send data to one of the modulators based on which communication mode is activated. For example, communications manager 256 may send data to modulator 255 if modulator 255 is coupled with beamformer 205 and the beamforming mode is activated. Also, communications manager 256 may send data to the other modulator if the other modulator is coupled with spreader 260 and the spreading mode is activated. In other examples, communications manager 256 may send data to both of the modulators as well as a command indicating which of the modulators is enabled to output data (in such cases, switch 256 may be optional).

Buffer 257 may be configured to store data that is to be transmitted for user terminals coupled with transmission system 200. In some examples, buffer 257 stores data for user terminals that are reached using beamforming in a first location and data for user terminals that are reached using spreading in a second location. Buffer 257 may output data for a user terminal to modulator 255 when the user terminal is scheduled to receive data from transmission system 200.

Beamformer 205 may be configured, in combination with the antenna elements, to transmit a data signal within spot beams that cover geographic regions within a service area of a satellite. Beamformer 205 may be configured to apply beamforming weights (e.g., phase shifts and magnitude adjustments) to a data signal received from modulator 255 to obtain multiple weighted signals that may be simultaneously transmitted over different antenna elements. In some examples, the weighted signals transmitted by beamformer 205 constructively and/or destructively combine to form a combined signal, where the energy of the combined signal is concentrated within coverage areas of corresponding spot beams.

First phase shifter 210 through nth phase shifter 220 may be configured to apply phase shifts to a received signal that is intended for a user terminal. In some examples, the phase shifters apply different phase shifts to the received signals. In some examples, the phase shifters are also configured to apply magnitude adjustments to the received signals. First phase shifter 210, second phase shifter 215, and nth phase shifter 220 may output the phase-shifted signals to first power amplifier 225, second power amplifier 230, and nth power amplifier 235. In some examples, first power amplifier 225, second power amplifier 230, and nth power amplifier 235 may be configured to adjust (e.g., increase or decrease) a magnitude of the received phase-shifted signals to obtain weighted signals. First power amplifier 225, second power amplifier 230, and nth power amplifier 235 may output the weighted signals to first antenna element 240, second antenna element 245, and nth antenna element 250. In some examples, the phase shifters and amplifiers may be configured to apply a combination of phase shifts and magnitude adjustments (which may also be referred to as weights) such that the energy of the resulting signal transmitted from the antenna elements is concentrated within a spot beam coverage area.

In some examples, beamformer 205 includes additional sets of phase shifters that are used in combination with additional sets of amplifiers and antenna elements to transmit beamformed signals in different spot beams. Additionally, or alternatively, first phase shifter 210, second phase shifter 215, and nth phase shifter 220 may be used to apply phase shifts to multiple data signals for user terminals located in different spot beam coverage areas, where the resulting phase-shifted signals may be amplified by first power amplifier 225, second power amplifier 230, and nth power amplifier 235, and the resulting weighted signals may be emitted by first antenna element 240, second antenna element 245, and nth antenna element 250. In some examples, multiple beamformed signals may be emitted such that a first beamformed signal is directed to a first spot beam coverage area and the second beamformed signal is directed to a second spot beam coverage area.

Spreader 260 may be configured, in combination with the antenna elements, to transmit spread data signals over broad beams that cover an entire (or majority of a) service area of a satellite, where the native coverage area of the antenna elements covers the entire (or majority of the) service area of the satellite. Spreader 260 may be configured to apply sequences (e.g., unique pseudorandom sequences, or orthogonal codes) to a data signal received from modulator 255 to obtain multiple coded signals that may be simultaneously transmitted over different antenna elements. In some examples, the coded signals transmitted by beamformer 205 neither constructively nor destructively combine with one another (or have minimal effects on one another), where the energy of the coded signals is spread across a service area of the satellite.

First component spreader 265 through nth component spreader 275 may be configured to apply sequences to a received data signal that is intended for a user terminal (or group of user terminals). In some examples, the component spreaders apply different sequences to the received signals. First component spreader 265, second component spreader 270, and nth component spreader 275 may output the coded signals to first power amplifier 225, second power amplifier 230, and nth power amplifier 235. In some examples, the component spreaders may each be coupled with one or more of the power amplifiers—e.g., first component spreader 265 may be coupled with first power amplifier 225 and second power amplifier 230. First power amplifier 225, second power amplifier 230, and nth power amplifier 235 may be configured to amplify the coded signals and output the amplified signals to first antenna element 240, second antenna element 245, and nth antenna element 250. In some examples, the energy of the resulting signal transmitted from the antenna elements is spread across a service area of a satellite—e.g., based on a native coverage area of the antenna elements. In some examples, the data signal may be intended to be received by multiple user terminals. Each user terminal that receives the data signal may apply a same set of despreading sequences to the data signal to extract the data.

In some examples, spreader 260 includes additional sets of code generators that are used in combination with additional sets of amplifiers and antenna elements to transmit additional coded signals for a data signal intended for a user terminal. In some examples, spreader 260 includes additional sets of code generators that are used in combination with additional sets of amplifiers and antenna elements to transmit additional coded signals for a data signal intended for another user terminal. For example, a first subset of antenna elements may transmit a first set of coded signals for a first user terminal, and a second subset of antenna elements may transmit, concurrently, a second set of coded signals for a second user terminal. The first set of coded signals and the second set of coded signals may be also be concurrently transmitted using the same bandwidth.

In some examples, transmission system 200 includes multiple modulators 255 and multiple spreaders 260. In such cases, transmission system 200 may be capable of transmitting multiple spread communications to multiple user terminals using different modulator/spreader pairs. In some examples, each modulator/spreader pair may be configured to transmit one stream of data to one or more user terminals. In some examples, different spreaders in the different modulator/spreader pairs may use orthogonal codes, enabling the modulator/spreader pairs to perform simultaneous spread communications to multiple user terminals (or multiple groups of user terminals). Each modulator/spreader pair may be coupled with the same or different (e.g., non-overlapping, or partially overlapping) subsets of the amplifiers and antenna elements.

Although spreader 260 is depicted as being in parallel with beamformer 205, in some examples, spreader 260 may be in series with beamformer 205 (e.g., may occur in the communications path before or after beamformer 205. When spreader 260 is positioned in series with beamformer 205, spreader 260 may be disabled when transmission system 200 is in a beamforming mode, and no sequence or a sequence of all is may be applied to signals received from modulator 255. And, when transmission system 200 is in a spreading mode, unique sequences may be applied to signals received from modulator 255, and beamformer 205 may be disabled such that no coefficients (e.g., beam weights) are applied to signals received from spreader 260. Alternatively, when transmission system 200 is in a spreading mode beamformer 205 may apply beam weights to suppress spot beam formation (e.g., to provide a broad beam for coverage of the spread signals).

Figure 3:
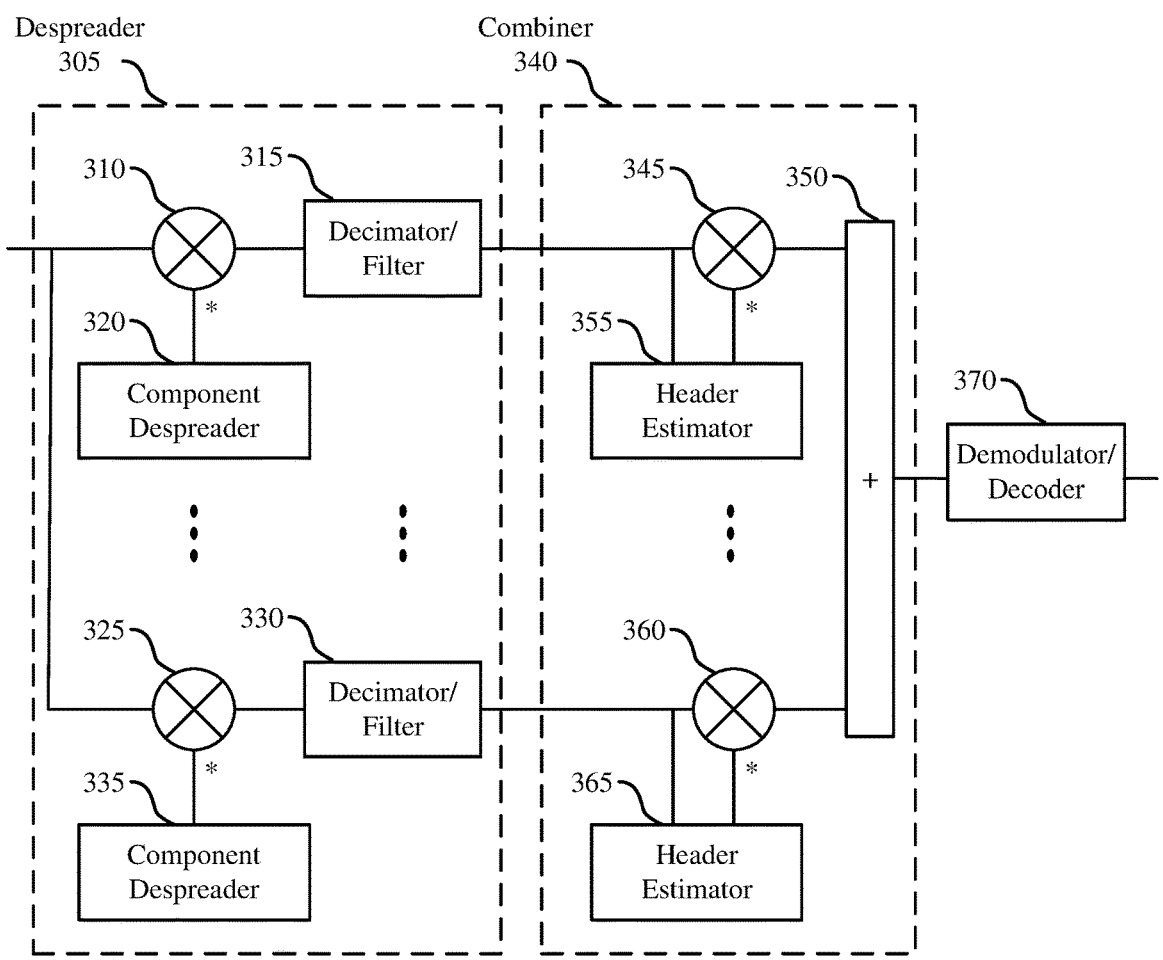
FIG. 3 shows a receiver that supports satellite communications using spread or wide coverage signals in accordance with examples as disclosed herein.

FIG. 3 shows a receiver that supports satellite communications using spread or wide coverage signals in accordance with examples as disclosed herein. Receiver 300 may be configured to receive a spread signal including multiple coded signals that have been spread using multiple sequences and are intended for the user terminal. Receiver 300 may be configured to separate the multiple coded signals by applying multiple sequences to the received signal. In some examples, the sequences may be the same as the sequences applied to a data signal used to generate the spread signal at a transmitter (e.g., transmission system 200 of FIG. 2). In some examples, the sequence may be based on, but different than, the sequences applied to the data signal at the transmitter—e.g., the sequences may be selected based on a combination of the sequences applied at the transmitter. Receiver 300 may be further configured to decimate the separated signals and apply a filter (e.g., low-pass filter) to the decimated signals to obtain despread data signals. Also, receiver 300 may be configured to estimate signal characteristics for the despread signals (which may include headers for estimating signal characteristics) and to combine the resulting despread signals to obtain a combined data signal including data signals that may be demodulated and decoded.

Receiver 300 may be included in a user terminal. Receiver 300 may be coupled with one or more antennas used to receive RF signals from a satellite. Ins some examples, receiver 300 may also be coupled with an analog-to-digital converter that digitizes the obtained RF signals. Receiver 300 may include despreader 305, combiner 340, and decoder 370. Despreader 305 may be configured to despread multiple spread signals (e.g., using a direct sequence) that are included in a signal received at receiver 300. To despread the spread signals, despreader 305 may be configured to apply sequences to the received signal and pass the obtained signals through a decimating low-pass filter. Despreader 305 may include first multiplier 310 and nth multiplier 325, first component despreader 320, and nth component despreader 335, first decimating filter 315, and nth decimating filter 330.

First multiplier 310 may be configured to apply a first sequence generated by first component despreader 320 to a received communication signal. In some examples, first multiplier 310 applies the complex conjugate of the first sequence to the received communication signal. After the first sequence is applied to the received communication signal, a component of the received signal that was spread using a corresponding sequence (e.g., the first sequence or a related sequence) may be isolated from the other components of the received signal. Similarly, nth multiplier 325 may apply an nth sequence generated by nth component despreader 335 to the received communication signal. After the set of sequences is applied to the received signal, the isolated signals may be passed to corresponding decimating filters.

First decimating filter 315 may decimate (e.g., discard samples or otherwise downsample) the first isolated signal output from first multiplier 310 to obtain a first downsampled signal. The decimation used by first decimating filter 315 may depend on the spreading codes (e.g., length of the spreading codes), for example to obtain a signal having the bandwidth of the original data stream. After decimation, first decimating filter 315 may apply a low-pass filter to the remaining samples to eliminate aliased components in the downsampled signal. In some examples, the low-pass filter may be applied prior to decimation. Similarly, nth decimating filter may decimate and apply a low-pass filter to an nth isolated signal output from nth multiplier 325 to obtain an nth downsampled signal. After downsampling and filtering the isolated signal, the decimating filters may output despread signals to combiner 340.

Combiner 340 may be configured to combine the despread signals output by despreader 305. To combine the despread signals, combiner 340 may be configured to estimate signal characteristics (e.g., phase, magnitude, timing and frequency characteristics) for the despread signals based on corresponding headers. The signal characteristics for the despread signals may also be referred to as coefficients for the despread signals. Combiner 340 may include first header estimator 355 and nth header estimator 365, second multiplier 345 and mth multiplier 360, and summing circuit 350.

First header estimator 355 may be configured to identify a header of a despread signal obtained from first decimating filter 315. In some examples, first header estimator 355 determines an amplitude and phase reference for the despread signal from the header. First header estimator 355 may also determine frequency and timing information for the despread signal from the header. The amplitude and phase reference for the despread signal may be used to determine an amplitude and phase of the despread signal relative to the amplitude and phase reference. In some examples, the header may also be used to determine characteristics of a channel between receiver 300 and an antenna element used to transmit the spread signal that corresponds to the despread signal obtained from first decimating filter 315. In some examples, second multiplier 345 is configured to apply the amplitude and phase references to the despread signal to obtain the data signal included in the despread signal. In some examples, second multiplier applies the complex conjugate of the amplitude and phase reference to the despread signal. In some examples, the obtained data signal is associated with one or more signal characteristics, such as SNR or symbol-to-noise ratio (which may be represented as the energy density per symbol $E_s$ verse the noise density $N_0$:

$$\left(\frac{E_s}{N_0}\right).$$

Similarly, nth header estimator 365 and mth multiplier 360 may output an nth data signal taking into account characteristics of a channel between receiver 300 and an antenna element used to transmit the spread signal that corresponds to the despread signal obtained from nth decimating filter 330 (effectively equalizing the channels from different transmit antenna elements at receiver 300). The data signals obtained by the header estimators and multipliers may be passed to summing circuit 350.

Summing circuit 350 may be configured to combine the obtained data signals with one another to obtain a combined data signal. In some examples, summing circuit 350 adds the obtained data signals together without effecting the signal noise, increasing the SNR (and/or symbol-to-noise ratio) of the data signals by a factor that is based on a number of spread components included in the received signal. Summing circuit 350 may output the combined data signal to decoder 370.

Decoder 370 may be configured to demodulate and decode combined data signals obtained from combiner 340. In some examples, decoder 370 may be configured to demodulate the combined data signals by mapping symbols included in the combined data signals to positions within a signal constellation that are each associated with unique binary values. After mapping the symbols to the positions, decoder 370 may be configured to generate a data stream from the symbols and decode the data stream to obtain the data included in the communication signal received at despreader 305.

Figure 4:
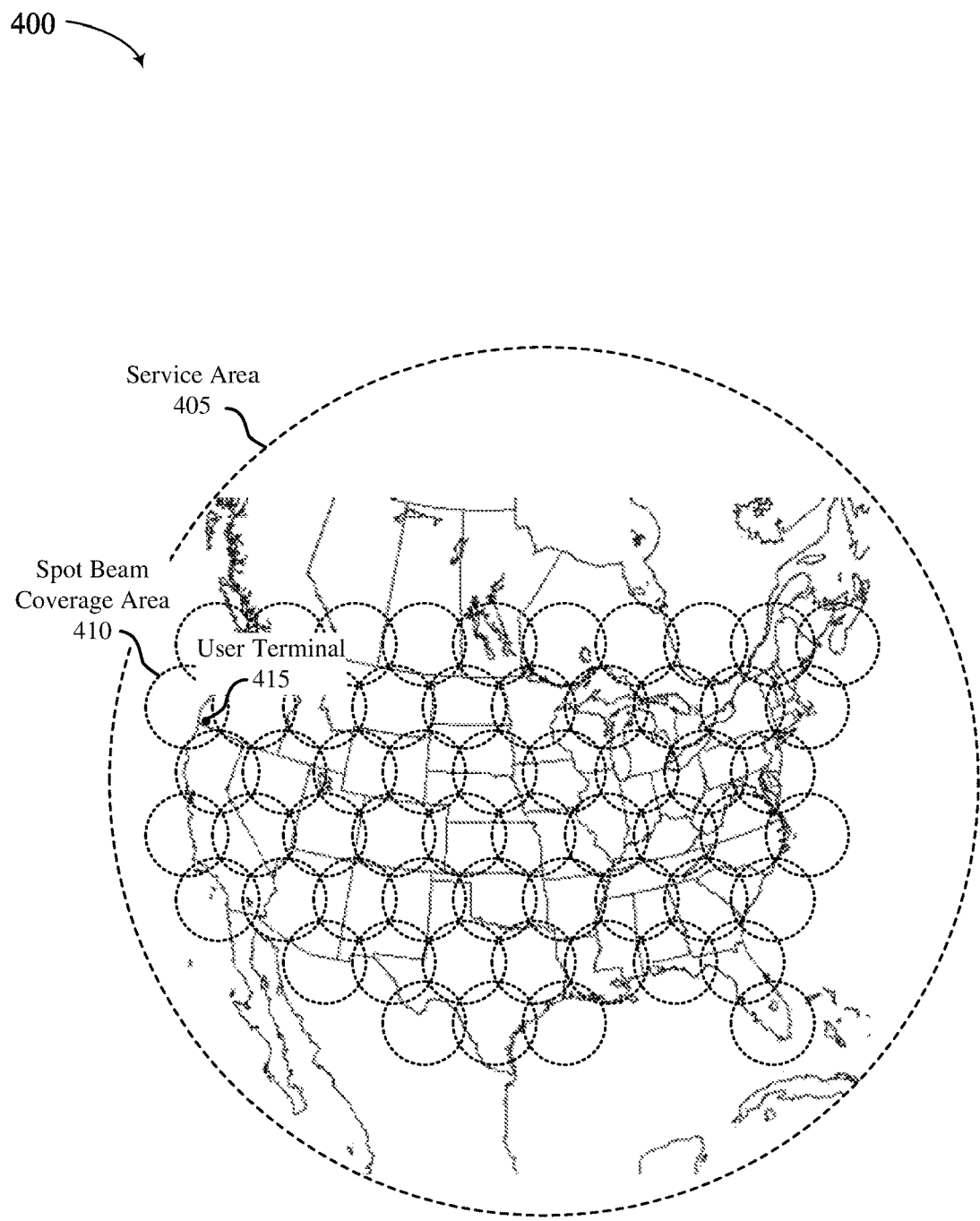
FIG. 4 shows a beam diagram that supports satellite communications using spread or wide coverage signals in accordance with examples as disclosed herein.

FIG. 4 shows a beam diagram that supports satellite communications using spread or wide coverage signals in accordance with examples as disclosed herein. Beam diagram 400 may depict a pattern of spot beam coverage areas configured for a satellite within a service area of the satellite. The spot beam coverage areas may be distributed (e.g., in a tiled pattern) across service area 405. In some examples, adjacent spot beam coverage areas use different portions of the wireless spectrum and/or different polarities from one another to avoid inter-spot beam interference. In some examples, a set of spot beam coverage areas (e.g., 4 spot beams, 7 spot beams) may use the entire wireless spectrum and set of polarizations. In some examples, the spot beam coverage areas are formed by a satellite communications system when a transmission system (e.g., transmission system 200 of FIG. 2) has activated a beamforming mode. In some examples, the spot beam coverage areas are formed by applying a fixed set of beamforming weights to data signals before transmission over the antenna elements. In some examples, the spot beam coverage areas correspond to configurable spot beams formed by applying configurable beamforming weights to data signals before transmission over a set of antenna elements in an antenna array.

User terminals may be located within one or more spot beams. For example, user terminal 415 may be located within spot beam coverage area 410. To communicate with user terminal 415, a satellite communications system may transmit communications for user terminal 415 in a spot beam that has spot beam coverage area 410. Thus, to communicate with user terminal 415, a satellite communications system may first determine a location of user terminal 415—to determine which spot beam to use for transmitting to user terminal 415. In some examples, user terminal 415 has a fixed location that is known to the satellite communications system. In some examples, the satellite communications system and user terminal 415 perform procedures that enable the satellite communications system to determine a location of user terminal 415—e.g., by exchanging location information using a broad beam channel, tracking movement of user terminal 415 for beam handoff, or by user terminal 415 transmitting its location or transmitting via a given return link beam.

In some examples, a user terminal may be located in a dead zone within a spot beam or at an edge of a spot beam coverage area. In such cases, the user terminal may be unable to receive communications from the satellite communications system. Also, in some examples, a user terminal may be unable to receive communications from the satellite communications system when the user terminal has an insufficient antenna gain—e.g., because an SNR may be below a threshold. In such cases, other communication techniques, such as the spreading technique described herein and with reference to FIG. 2, may be capable of providing more reliable service to the user terminal.

Figure 5:
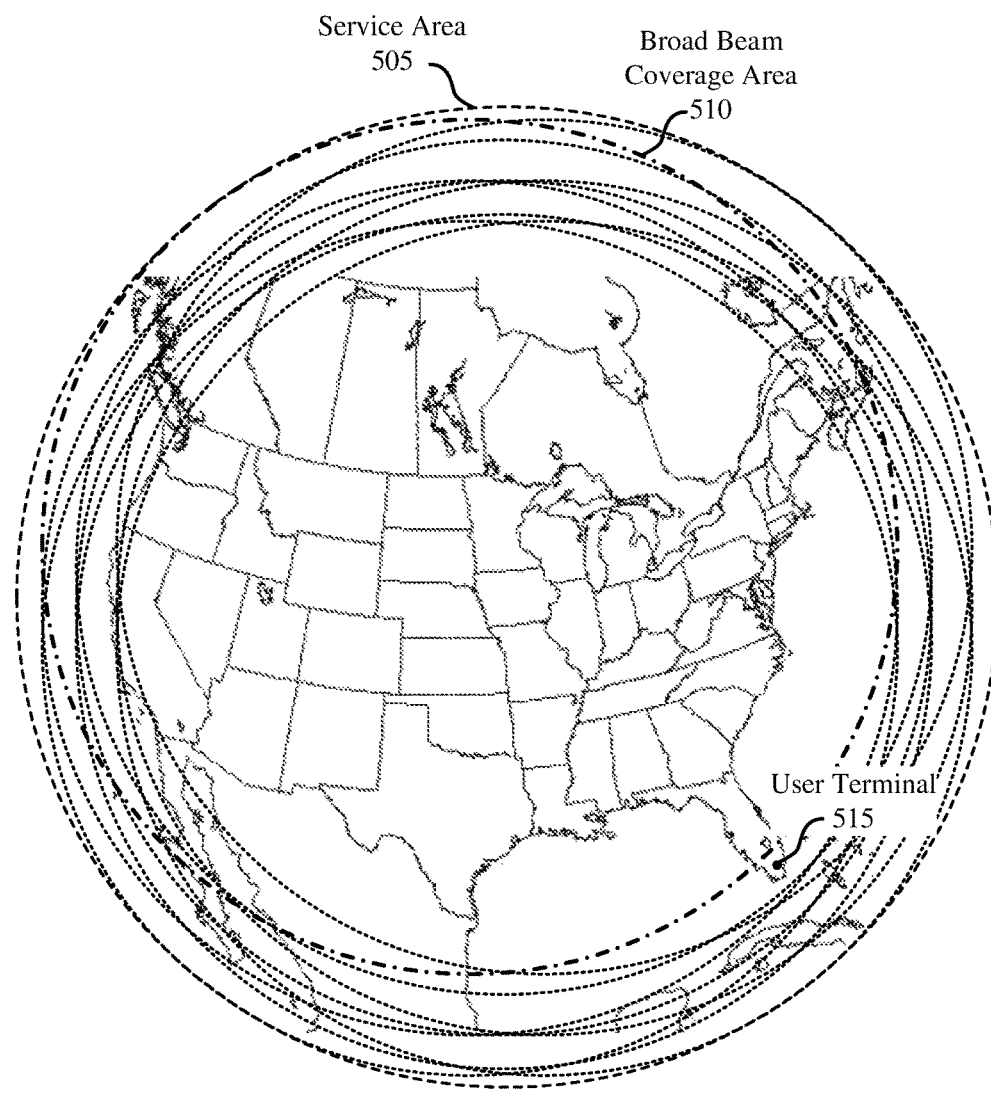
FIG. 5 shows a beam diagram that supports satellite communications using spread or wide coverage signals in accordance with examples as disclosed herein.

FIG. 5 shows a beam diagram that supports satellite communications using spread or wide coverage signals in accordance with examples as disclosed herein. Beam diagram 500 may depict a pattern of broad beam coverage areas configured for a satellite within a service area of the satellite. In some examples, the broad beam coverage areas correspond to the native beams of distinct antenna elements in an antenna array (e.g., the antenna elements used for beamforming spot beams as shown in FIG. 4). The broad beam coverage areas may have a high degree of overlap with one another. For example, the broad beam coverage areas may have at least 50% overlap with at least one other broad beam, or may have at least 50% overlap with more than a quantity (e.g., two, three, four, five, etc.) of neighboring broad beam coverage areas. In some examples, the broad beam coverage areas span a significant portion (e.g., greater than 20%, greater than 50%, greater than 70%, greater than 80%) of service area 505. In some cases, service area 505 is defined by an area having at least some quantity or percentage of broad beam coverage areas. In some examples, overlapping broad beam coverage areas use overlapping portions of the wireless spectrum. In some examples, service area 505 is a coverage area for a satellite communications system when a transmission system (e.g., transmission system 200 of FIG. 2) has activated a spreading mode.

As discussed herein and with reference to FIG. 2, each broad beam (or a set of broad beams) may include a communication signal for user terminal that has been spread using a unique sequence (e.g., pseudorandom sequence or orthogonal code). User terminal 515 may receive the respective communication signals in each of the broad beams that encompass user terminal 515 (e.g., in a combined signal), despread the received communication signals, and combine the resulting data signals to obtain a combined data signal for decoding.

User terminals may be located within multiple broad beams. In some examples, user terminal 515 may be located within multiple broad beams while being located outside of broad beam coverage area 510. In such cases, a communication signal including data for user terminal 515 that is transmitted in broad beam coverage area 510 may not be received by user terminal 515. That said, if another communication signal including the data for user terminal 515 is transmitted in additional broad beam coverage areas (including one or more broad beam coverage area that encompass user terminal 515) user terminal 515 may still obtain the data. Thus, a satellite communications system that uses spreading may communicate data to user terminal 515 without knowing a location of user terminal 515. In some examples, user terminal 515 may take measures to prevent the satellite communications system from determining a location for user terminal 515. In some examples, a transmission system determines a general location of a user terminal (e.g., Central America) and transmits data for the user terminal over antenna elements associated with broad beams that cover the general location.

Figure 6:
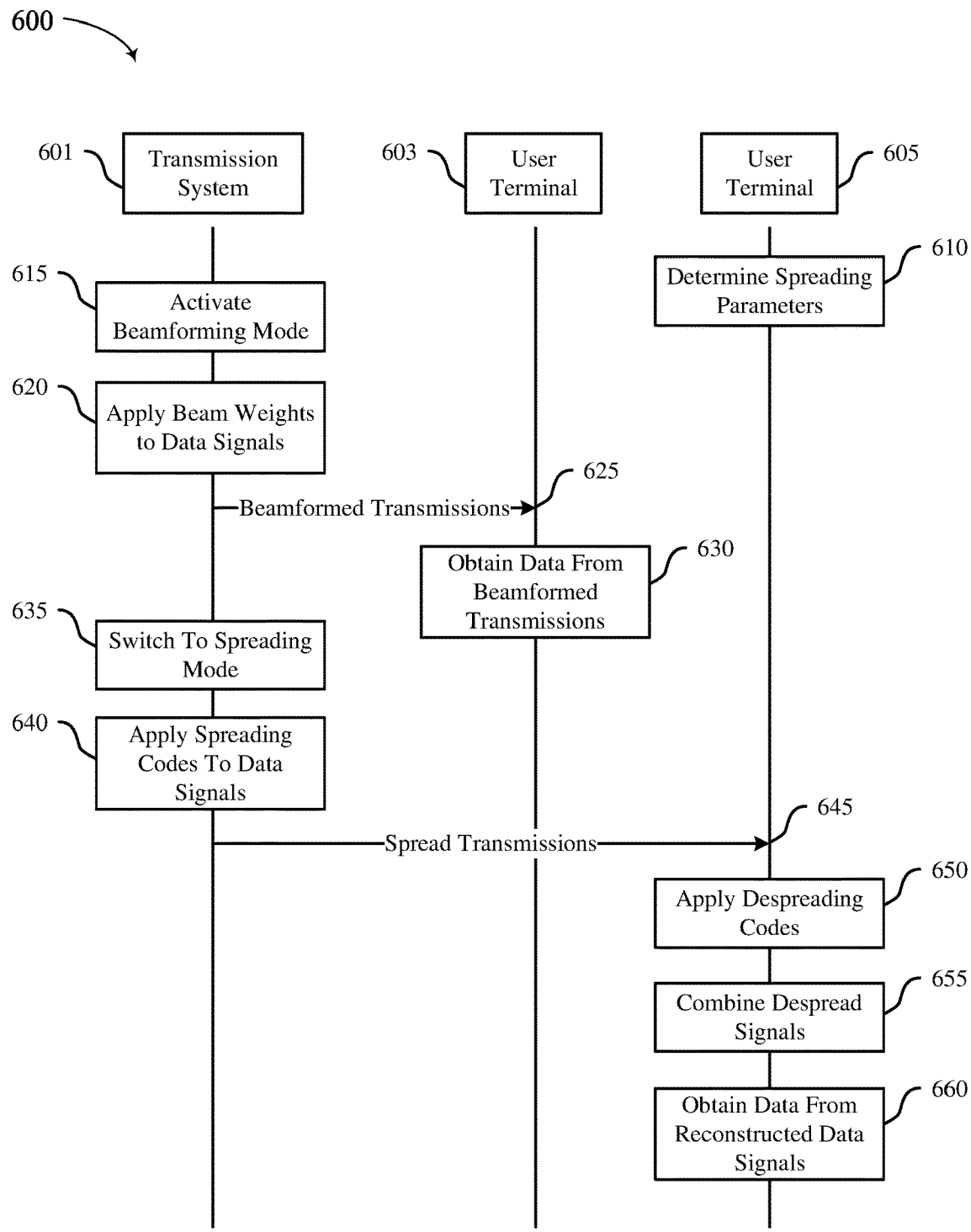
FIGS. 6 through 8 show diagrams of processes that support satellite communications using spread or wide coverage signals in accordance with examples as disclosed herein.

FIG. 6 shows a diagram of a process that supports satellite communications using spread or wide coverage signals in accordance with examples as disclosed herein.

Process flow 600 may be performed by transmission system 601, which may be an example of an access node terminal, satellite, or a combination thereof, as described above with reference to FIGS. 1 and 2. Process flow 600 may also be performed by first user terminal 603 and second user terminal 605, which may be examples of user terminals described above with reference to FIGS. 1 and 3. In some examples, transmission system 601 may determine a location of first user terminal 603 but be unable to determine a location of second user terminal 605.

In some examples, process flow 600 illustrates an exemplary sequence of operations performed to support performing satellite communications using spread or wide coverage signals. For example, process flow 600 depicts operations for switching between beamforming and spreading modes to transmit information to user terminals within a service area of transmission system 601. It is understood that one or more of the operations described in process flow 600 may be performed earlier or later in the process, omitted, replaced, supplemented, or performed in combination with another operation. Also, additional operations described herein that are not included in process flow 600 may be included.

At 610, second user terminal 605 may determine spreading parameters that may be used for subsequent transmissions from transmission system 601. In some examples, second user terminal 605 determines the spreading parameters based on a geographic location of second user terminal 605—e.g., second user terminal may determine that transmission system 601 is configured to use a set of spreading codes to broadcast to user terminals in North America. In other examples, second user terminal 605 may be programmed (e.g., prior to deployment) to use a set of spreading of codes to receive transmissions from transmission system 601, where transmission system 601 may be provided with a mapping between the set of spreading codes and second user terminal 605.

At 615, transmission system 601 may activate a beamforming mode for performing communications. In some examples, transmission system 601 activates the beamforming mode based on a communication schedule that indicates a first interval for beamforming in a scheduling period and a second interval for spreading in the scheduling period. The first interval may be longer than the second interval—e.g., the first interval may span 97% of the scheduling period and the second interval may span 3% of the scheduling period. In some examples, a throughput of transmission system 601 may be greater during the first interval than the second interval—e.g., for a 100 MHz channel, the throughput may be around 10 Gigasymbols (Gsym) per second (Gsym/sec) during the first interval and around 1 Msym/sec during the second interval, and the aggregate throughput of transmission system 601 across the scheduling period may be around 9.7 Gsym/sec. In some examples, an SNR (and/or symbol-to-noise ratio) of communications transmitted in the first interval is less than an SNR (and/or symbol-to-noise ratio) of communications transmitted in the second interval—e.g., the symbol-to-noise ratio may be around 22 dB higher during the second interval.

At 620, transmission system 601 may apply beam weights to data signals for transmission to one or more user terminals (e.g., including first user terminal 603). In some examples, the data signals include a header portion and a data portion, where the header portion may be used by a user terminal to determine signal coefficients (e.g., magnitude, phase, frequency, and timing information) for a received data signal. In some examples, the header portion may be used to estimate a channel between a user terminal and transmission system 601. The determined signal coefficients may be used to assist with demodulating and decoding the data portion. In some examples, transmission system 601 applies beam weights to a data signal intended for first user terminal 603 that causes the energy of a resulting beamformed signal to be concentrate within a spot beam coverage area that encompasses first user terminal 603. Before applying the beam weights to the data signals, transmission system 601 may modulate data to obtain the data signals. In some examples, transmission system 601 may use a first modulation and coding scheme based on the beamforming mode being enabled.

At 625, transmission system 601 may transmit the beamformed signals to the user terminals. In some examples, transmission system 601 may transmit one or more beamformed signals to first user terminal 603 using a spot beam having a coverage area that encompasses first user terminal 603. Transmission system 601 may transmit additional beamformed signals to other user terminals using other spot beams. Some of the spot beams (e.g., adjacent or overlapping spot beams) may use different portions of a wireless spectrum than one another, while other spot beams (e.g., non-adjacent or non-overlapping spot beams) may use common portions of the wireless spectrum.

At 630, first user terminal 603 may obtain data from a received beamformed signal. In some examples, first user terminal 603 may apply receive beam weights to the received beamformed signal to enhance signal characteristics of the received beamformed signal before demodulating the received beamformed signal. In some examples, first user terminal 603 determines a set of receive beam weights to apply to the received beamformed signal based on the header portion of the beamformed signal and/or prior beamformed signals. After receiving the beamformed signal, first user terminal 603 may demodulate the beamformed signal, by mapping data symbols in the beamformed signal to positions in a symbol constellation associated with the first modulation and coding scheme. Based on mapping the data symbols to the symbol constellation, first user terminal 603 may decode the data symbols to obtain a stream of binary data.

At 635, transmission system 601 may switch to a spreading mode for performing communications. In some examples, transmission system 601 activates the spreading mode based on the second interval in the scheduling period beginning. As part of switching to the spreading mode, transmission system 601 may access a buffer used to store data for user terminals that have an unknown location and/or a buffer used to store data that is to be broadcast to multiple user terminals. Also, as part of switching to the spreading mode, transmission system 601 may deactivate a beamformer and activate a spreader that is coupled with a same set of power amplifiers and antenna elements as the beamformer.

At 640, transmission system 601 may apply spreading code to data signals intended for a user terminal having an unknown location and/or a set of user terminals (e.g., if broadcasting is enabled). In some examples, transmission system 601 applies a set of unique spreading codes to a data signal to obtain multiple spread signals that each carry the same data. In some examples, the data signal is intended for a user terminal having an unknown location (e.g., second user terminal 605). In other examples, the data signal is intended for multiple user terminals (e.g., including second user terminal 605). Transmission system 601 may then output the multiple spread signals to a set of power amplifiers that is coupled with a set of antenna elements and configured to amplify the multiple spread signals before the spread signals are provided to the set of antenna elements. Before applying the beam weights to the data signals, transmission system 601 may modulate data to obtain the data signals. In some examples, transmission system 601 may use a first modulation and coding scheme based on the beamforming mode being enabled. Before applying the spreading codes to the data signals, transmission system 601 may modulate data to obtain the data signals. In some examples, transmission system 601 may use a second modulation and coding scheme based on the spreading mode being enabled. In some examples, symbols generated using the second modulation and coding scheme convey additional information relative to symbols generated using the modulation and coding scheme used when the beamforming mode is enabled.

At 645, transmission system 601 may transmit the spread signals to the user terminals. In some examples, transmission system 601 may transmit one or more spread signals to second user terminal 605 using multiple broad beams having coverage areas that cover a significant portion of the service and significantly overlap with one another. In some examples, a subset (or all) of the broad beams encompass second user terminal 605. In some examples, transmission system 601 may transmit one or more spread signals to multiple user terminals (including second user terminal 605) using multiple broad beams having coverage areas that cover a significant portion of the service and significantly overlap with one another. In some examples, a subset (or all) of the broad beams encompass second user terminal 605. Similarly, a subset (e.g., a different subset) (or all) of the broad beams may encompass additional user terminals of the multiple user terminals.

In some examples, transmission system 601 transmits a first set of spread signals using a first set of sequences and a second set of spread signals using a second set of sequences. The first set of sequences may be intended for second user terminal 605, and the second set of spread signals may be intended for a third user terminal (not shown). Also, the first set of sequences may be orthogonal to the second set of sequences.

At 650, second user terminal 605 may apply a set of despreading codes to a spread transmission received at second user terminal 605. In some examples, second user terminal 605 applies the same set of spreading codes to the received spread transmission that transmission system 601 applied to obtain the spread transmission. In other examples, second user terminal 605 applies a different set of despreading codes to the received spread transmission, where the different set of despreading codes may be based on the set of spreading codes applied by transmission system 601 to obtain the spread transmission. For example, the different set of despreading codes may be based on a combination of the set of spreading codes applied by transmission system 601 to obtain the spread transmission. After applying the set of despreading codes to the received spread transmission, second user terminal 605 may isolate the spread signals transmitted from the different antenna elements at transmission system 601. Next, second user terminal 605 may apply decimating filters to the isolated spread signals to obtain despread signals that correspond to the original data signal.

In some examples, all or a subset of the spread signals transmitted from transmission system are intended for multiple user terminals. In such cases, a third user terminal that receives the spread signals may apply a same (or similar) set of despreading codes to the spread signals. In other examples, a first subset of the spread signals are intended for second user terminal 605, and another subset of the spread signals are intended for a third user terminal. Second user terminal 605 may apply a first set of despreading codes to the received spread signals to despread the first subset of the spread signals, and the third user terminal may apply a second set of despreading codes to the received spread signals to despread the second subset of the spread signals. In some examples, the first set of despreading codes are orthogonal to the second set of despreading codes.

At 655, second user terminal 605 may combine the despread signals with one another to obtain a combined data signal having enhanced signal characteristics. Second user terminal 605 may use a header portion of the despread signals to determine signal coefficients (e.g., phase, amplitude, frequency, timing parameters) for the despread signals and to reconstruct the original data symbols included in the original data signal. In some examples, the individual original data symbols may have a first symbol-to-noise ratio. After reconstructing the original data symbols, second user terminal 605 may combine the reconstructed data symbols to obtain combined data symbols. In some examples, the combined data symbols may have a second symbol-to-noise ratio that is larger than the first symbol-to-noise ratio—e.g., based on the number of despread signals obtained at second user terminal 605. Second user terminal 605 may use the combined data symbols to reconstruct the data signals transmitted from transmission system 601. The third user terminal may similarly generate a combined data signal using a set of received data signals transmitted from transmission system 601 using a different set of spreading codes.

At 660, second user terminal 605 may obtain data from the reconstructed data signal. In some examples, second user terminal demodulates the combined data symbols, mapping the data symbols to positions in a symbol constellation associated with the second modulation and coding scheme. Based on mapping the data symbols, second user terminal may generate a stream of binary data. When the spread transmission received from transmission system 601 includes data for multiple user terminals, another user terminal may similarly receive the spread transmission over multiple broad beams and extract data from the spread transmission. The third user terminal may similarly obtain data from a data signal reconstructed using the combined data signal.

In some examples, a user terminal (e.g., user terminal 603 and/or user terminal 605) may be capable of receiving both beamformed and spread transmissions.

In such cases, to receive a beamformed transmission, the user terminal may bypass a despreader (e.g., despreader 305) used to receive spread signals. In other examples, the user terminal may not bypass the despreader, but may instead apply a sequence to signals received at the user terminal that does not alter the received signals (e.g., a sequence of all ones or zeros). In some examples, the user terminal may also disable a decimating filter in the receive path.

To receive a spread transmission, the user terminal may apply despreading sequences to received spread transmissions and combine the resulting despread signal. In some examples, the user terminal includes a communications manager that is used to activate and deactivate a despreader in the user terminal. In some examples, the communications manager controls a switch (or set of switches) that control a receive path of the received signals. For example, the communications manager may open a switch that connects one or more antennas to a despreader and close a switch that bypasses the despreader when a beamforming mode is enabled, and vice versa.

As suggested herein, the SNR (and/or symbol-to-noise ratio) for the spread transmissions may be greater than the SNR (and/or symbol-to-noise ratio) for the beamformed transmissions—e.g., because multiple versions of a same data signal may be transmitted to a single user terminal when a spreading mode is enabled. For example, consider the following scenario: Musers may be supported by transmission system 601, and M symbols [$a_1$, $a_2$, ..., $a_m$] are simultaneously transmitted to the M users. The complex-valued matrix $$A = \begin{bmatrix} a_1 & \cdots & 0 \\ \vdots & \ddots & \vdots \\ 0 & \cdots & a_M \end{bmatrix}$$

may be used to represent the M symbols. If one signal is applied to each power amplifier, the power amplifier may use a 1 dB power back off, and $$|a_m| = 10^{\left(-\frac{1}{20}\right)}$$

for any 0≤m≤M. If more than one signal is applied to each power amplifier, the power amplifier may use a 3 dB power back off plus an additional $10 \log_{10}(M)$ power back off, and $$|a_m| = 10^{\left(\frac{-3-10\ log_{10}(M)}{20}\right)}.$$

The time-domain waveform for the mth user's symbol at an nth time sample may be represented as $p_m[n]$. More generally, the time-domain waveform for each user may be represented by the complex-valued matrix $$P = \begin{bmatrix} p_1[1] & p_1[2] & \cdots & p_1[K] \\ p_2[1] & p_2[2] & \cdots & p_2[K] \\ \vdots & \vdots & \cdots & \vdots \\ p_M[1] & p_M[2] & \cdots & p_M[K] \end{bmatrix},$$

which may be used to represent M users with K time-domain samples per symbol. K may equal the spreading factor if DSSS is used.

To obtain the spread symbols, matrices A and P may be multiplied together, such that $$AP = \begin{bmatrix} a_1 & 0 & \cdots & 0 \\ 0 & a_2 & \cdots & 0 \\ \vdots & \vdots & \cdots & \vdots \\ 0 & \cdots & \cdots & a_m \end{bmatrix} \begin{bmatrix} p_1[1] & p_1[2] & \cdots & p_1[K] \\ p_2[1] & p_2[2] & \cdots & p_2[K] \\ \vdots & \vdots & \cdots & \vdots \\ p_M[1] & p_M[2] & \cdots & p_M[K] \end{bmatrix}.$$

Further if the spread symbols are transmitted using a beamformer architecture, the beamformed symbols may be obtained by multiple matrices A and P with a beamforming matrix B, where $$B = \begin{bmatrix} b_{1,1} & b_{1,2} & \cdots & b_{1,M} \\ b_{2,1} & b_{2,2} & \cdots & b_{2,M} \\ \vdots & \vdots & \cdots & \vdots \\ b_{M,1} & b_{M,2} & \cdots & b_{M,M} \end{bmatrix}, \text{ and}$$

$$BAP = \begin{bmatrix} b_{1,1} & b_{1,2} & \cdots & b_{1,M} \\ b_{2,1} & b_{2,2} & \cdots & b_{2,M} \\ \vdots & \vdots & \cdots & \vdots \\ b_{M,1} & b_{M,2} & \cdots & b_{M,M} \end{bmatrix} \begin{bmatrix} a_1 & 0 & \cdots & 0 \\ 0 & a_2 & \cdots & 0 \\ \vdots & \vdots & \cdots & \vdots \\ 0 & \cdots & \cdots & a_m \end{bmatrix}$$

-continued $$\begin{bmatrix} p_1[1] & p_1[2] & \cdots & p_1[K] \\ p_2[1] & p_2[2] & \cdots & p_2[K] \\ \vdots & \vdots & \cdots & \vdots \\ p_M[1] & p_M[2] & \cdots & p_M[K] \end{bmatrix}.$$

Each of the M transmit antenna elements may send K time domain samples. In some examples, the signal that is transmitted from the antenna array may be equal to BAP.

The channel between the Mtransmit antenna elements and the Muser locations may be represented using a matrix C, where the waveform received at the M user locations may be equal to CBAP. Each user will experience additive white Gaussian noise, which may be represented by the matrix W, where an expected value of the white noise $E\{WW^H\}$ may be assumed to be equal $2\sigma^2 * I$, where I is an identity matrix with M rows and K columns. The waveforms received at the M user locations may thus be represented by the matrix R, which may be equal to CBAP+W, where the mth row and kth column of R contain which may equal the receive sample at location m during time-sample k.

To obtain the received symbols a matched filter may be applied to the received waveform—e.g., based on the spreading sequences used for matrix P. Thus, the matched filter output may be represented by the complex-valued matrix Y, where $Y = PR^H$. The rows of matrix Y may store the matched filter output for one spreading code across M terminal locations and the columns of matrix Y may store the matched filter output for different spreading codes at one terminal location. Expanded this equation, Y=P [CBAP+W]$^H$. Using Hermitian transpose properties, the general equation for the matched filter output may be obtained as=$PP^H A^H B^H C^H + PW^H$, where $PP^H$ may provide spatial information for the matched filter output (e.g., cross-correlation between formed beams) and $B^H C^H$ may provide temporal information for the matched filter output (e.g., spreading code cross-correlation).

The general equation may be used to compare the performance of beamformed transmissions that use spot beams and spread transmissions that use broad beams. For example, for beamformed communications to Muser terminals that use equal power in M orthogonal beams, $B^H C^H$ may equal MI, where I is the identity matrix. Also, the power amplifiers may use a power back off of $$10^{\left(\frac{-3-10 log_{10}(M)}{20}\right)},$$

such that $$|a_m| = 10^{\left(\frac{-3-10 log_{10}(M)}{20}\right)}.$$

Additionally, there may be no channelization through spreading and P may equal $$\begin{bmatrix} 1 & 1 & \cdots & 1 \\ 1 & 1 & \cdots & 1 \\ \vdots & \vdots & \cdots & \vdots \\ 1 & 1 & \cdots & 1 \end{bmatrix}.$$

Thus, the matched filter output $S_1 = PP^H A^H B^H C^H + PW^H = PP^H A^H M + PW^H$, which may further reduced to $$\begin{bmatrix} a_1^* & a_2^* & \cdots & a_M^* \\ a_1^* & a_2^* & \cdots & a_M^* \\ \vdots & \vdots & \cdots & \vdots \\ a_1^* & a_2^* & \cdots & a_M^* \end{bmatrix} MK + PW^H.$$

The signal power at the mth terminal may equal $|a_0|^2 (MK)^2$ and an expected value of the noise power $E\{PW^H(PW^H)^H\} = E\{PW^H WP^H\}$ may be determined such that each correlation output may have the variance $2\sigma^2 K$. Thus, the SNR for the kth terminal may be equal to $$\frac{|a_m|^2 (MK)^2}{2\sigma^2 K},$$

which may reduce to $$\frac{|a_m|^2 M^2 K}{2\sigma^2},$$

which may further reduce $$\frac{(10^{((-3-10\log_{10} M)/10)} * M^2 K)}{2\sigma^2},$$

which may further reduce to $$\left(\frac{1}{2M}\right) \frac{M^2 K}{2\sigma^2},$$

which may further reduce to $$\frac{MK}{4\sigma^2}.$$

For spread communications to a user terminal using orthogonal (or nearly orthogonal) spreading codes of each of the M transmit antenna elements, $PP^H$ may equal KI, where I is the identity matrix, and B may equal an M×M identity matrix. Also, if only one signal passes through each power amplifier, and each power amplifier is coupled with one transmit antenna element, $|a_m|$ may equal $$10^{\left(-\frac{1}{20}\right)}$$

and $|a_m|^2$ may equal 0.7943. Additionally, each symbol a may be identical, and the matrix A may equal aI, where aI is a scaled identity matrix. Thus, the matched filter output $S_1 = PP^H A^H B^H C^H + PW^H = C^H aK + PW^H$. If the terminal forms a good estimate of the channel (e.g., using a header included in the received signal), the terminal may use the channel estimate to obtain the SNR by processing $CS_2 = CC^H aK + CPW^H$ and determining the expected value of the signal $E\{CS_2\} = aIMK$ and an expected value of jthe noise power $E\{CPW^H(CPW^H)^H\}$ may be determined such that the noise variance in each terminal may be equal to $2\sigma^2 MK$. Thus, the SNR for each terminal may be equal to $$\frac{|a_m|^2 (MK)^2}{2\sigma^2 MK},$$

which may reduce to $$\frac{.79432 MK}{2\sigma^2}.$$

For a spot beam, K may be greater than or equal to 1 and M may be equal to 100. For broad beams that uses multiple spreading codes for a user, K may be greater than or equal to M and M may be equal to 1. In such a case, the symbol-to-noise ratio for communications using the spot beam may be greater than or equal to $$\frac{25}{\sigma^2}$$

and communications using the broad beams may be greater than or equal to $$\frac{3970}{\sigma^2},$$

where communications using the broad beams may have an symbol-to-noise ratio that is at least 22 dB greater than communications using the spot beam. Also, the symbol rate in the spot beam across a 100 MHz bandwidth may be less than or equal to 100 Msym/sec and the symbol rate across the broad beams may be less than or equal to 1 Msym/sec. Because the spot beams reuse wireless spectrum across a service area, the aggregate system symbol rate when spot beams are used may be less than or equal to 10 Gsym/sec, while the aggregate symbol rate when broad beams are used may remain at 1 Msym/sec. Thus, to obtain the benefit of the spreading technique described herein, the satellite communications system may use this spreading technique sparingly (e.g., less than 5% of the time) and may enable only user terminals that have a premium subscription to communicate with the satellite communications system using this spreading technique. Additionally, or alternatively, the satellite communications system may use this spreading technique to broadcast common information to multiple user terminals to increase a quantity of user terminals that may be serviced by this spreading technique.

Although described in the context of a satellite communications system. Aspects of the communication techniques described herein may also be used for non-satellite communications (e.g., terrestrial communications). For example, a transmitting device (e.g., a wireless access point) may include a transmission system that is similar to transmission system 200 and switch between beamforming and the enhanced spreading technique described herein (which involves applying multiple spreading codes to a data signal intended for one or more users). Also, a receiving device (e.g., a wireless terminal) may include a receiver that is similar to receiver 300 and receive signals that have been transmitted in accordance with the enhanced spreading technique described herein.

Figure 7:
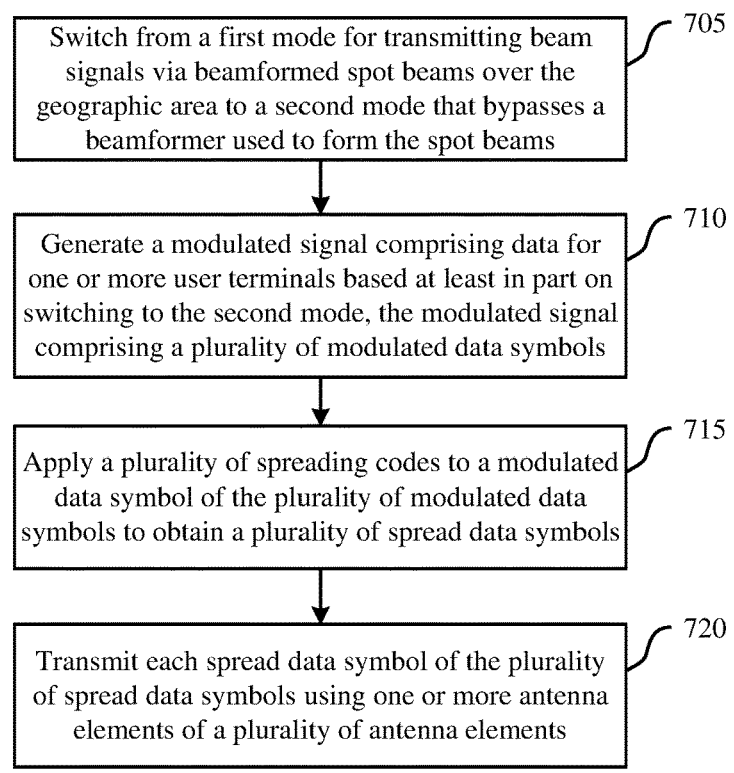

FIG. 7 shows a diagram of a process that supports satellite communications using spread or wide coverage signals in accordance with examples as disclosed herein. The operation of method 700 may be implemented by a user terminal or its components as described herein. In some examples, a processing system in the user terminal may execute a set of instructions to control the functional elements of the satellite to perform the described functions. Additionally, or alternatively, the processing system may perform aspects of the described functions using special-purpose hardware.

At 705, the satellite communications system may switch from a first mode for transmitting beam signals via beamformed spot beams over the geographic area to a second mode that bypasses a beamformer used to form the spot beams. The operations of 705 may be performed according to the techniques described herein. In some examples, aspects of the operations of 705 may be performed by a transmission system (e.g., transmission system 200 of FIG. 2, using a communications manager, for example) as described herein.

At 710, the satellite communications system may generate a modulated signal including data for one or more user terminals based on switching to the second mode, the modulated signal including a set of modulated data symbols. The operations of 710 may be performed according to the techniques described herein. In some examples, aspects of the operations of 710 may be performed by a modulator (e.g., modulator 255 of FIG. 2) as described herein.

At 715, the satellite communications system may apply a set of spreading codes to a modulated data symbol of the set of modulated data symbols to obtain a set of spread data symbols. The operations of 715 may be performed according to the techniques described herein. In some examples, aspects of the operations of 715 may be performed by a spreader (e.g., spreader 260 of FIG. 2) as described herein.

At 720, the satellite communications system may transmit each spread data symbol of the set of spread data symbols using one or more antenna elements of a set of antenna elements. The operations of 720 may be performed according to the techniques described herein. In some examples, aspects of the operations of 720 may be performed by a transmission system (e.g., transmission system 200 of FIG. 2, using a set of antennas, for example) as described herein.

In some examples, an apparatus as described herein may perform a method or methods, such as the method 700. The apparatus may include features, means, or instructions (e.g., a non-transitory computer-readable medium storing instructions executable by a processor) for switching from a first mode for transmitting beam signals via beamformed spot beams over the geographic area to a second mode that bypasses a beamformer used to form the spot beams, generating a modulated signal including data for one or more user terminals based on switching to the second mode, the modulated signal including a set of modulated data symbols, applying a set of spreading codes to a modulated data symbol of the set of modulated data symbols to obtain a set of spread data symbols, and transmitting each spread data symbol of the set of spread data symbols using one or more antenna elements of a set of antenna elements.

Some examples of the method 700 and the apparatus described herein may further include operations, features, means, or instructions for receiving data for a user terminal having a location within a geographic area that may be unknown to a transmitter used to transmit the set of spread data symbols.

Some examples of the method 700 and the apparatus described herein may further include operations, features, means, or instructions for switching from the second mode to the first mode based on a schedule for switching between the first mode and the second mode.

Some examples of the method 700 and the apparatus described herein may further include operations, features, means, or instructions for identifying a first interval for operating in the first mode and a second interval for operating in the second mode, where switching to the second mode may be based on an occurrence of the second interval.

Some examples of the method 700 and the apparatus described herein may further include operations, features, means, or instructions for receiving second data for a second user terminal having a known location within the geographic area, generating a second modulated signal including the second data based on switching to the first mode, the second modulated signal including a second set of modulated data symbols, applying a set of beam weights to a second modulated data symbol of the second set of modulated data symbols to obtain a set of weighted data symbols, and transmitting each weighted data symbol of the set of weighted data symbols using one or more antenna elements of the set of antenna elements.

Some examples of the method 700 and the apparatus described herein may further include operations, features, means, or instructions for amplifying the set of spread data symbols, where the transmitting includes.

Figure 8:
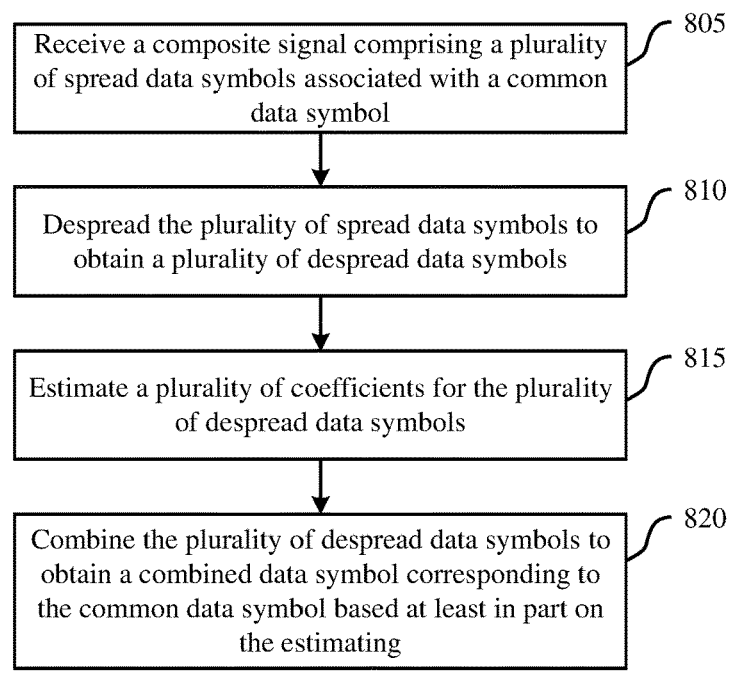

FIG. 8 shows a diagram of a process that supports satellite communications using spread or wide coverage signals in accordance with examples as disclosed herein. The operation of method 800 may be implemented by an access node terminal and/or satellite or its components as described herein. In some examples, a processing system in the access node terminal and/or satellite may execute a set of instructions to control the functional elements of the satellite to perform the described functions. Additionally, or alternatively, the processing system may perform aspects of the described functions using special-purpose hardware.

At 805, a composite signal including a set of spread data symbols associated with a common data symbol may be received. The operations of 805 may be performed according to the techniques described herein. In some examples, aspects of the operations of 805 may be performed by a receiver (e.g., using receiver 300 of FIG. 3, using one or more antennas, for example) as described herein.

At 810, the set of spread data symbols may be despread to obtain a set of despread data symbols. The operations of 810 may be performed according to the techniques described herein. In some examples, aspects of the operations of 810 may be performed by a despreader (e.g., despreader 305 of FIG. 3, using code generators, multipliers, and decimating filters, for example) as described herein.

At 815, a set of coefficients for the set of despread data symbols may be estimated. The operations of 815 may be performed according to the techniques described herein. In some examples, aspects of the operations of 815 may be performed by a header estimator (e.g., first header estimator 355 of FIG. 3) as described herein.

At 820, the set of despread data symbols may be combined to obtain a combined data symbol corresponding to the common data symbol based on the estimating. The operations of 820 may be performed according to the techniques described herein. In some examples, aspects of the operations of 820 may be performed by combiner (e.g., combiner 340 of FIG. 3, using a summing circuit, for example) as described herein.

In some examples, an apparatus as described herein may perform a method or methods, such as the method 800. The apparatus may include features, means, or instructions (e.g., a non-transitory computer-readable medium storing instructions executable by a processor) for receiving a composite signal including a set of spread data symbols associated with a common data symbol, despreading the set of spread data symbols to obtain a set of despread data symbols, estimating a set of coefficients for the set of despread data symbols, and combining the set of despread data symbols to obtain a combined data symbol corresponding to the common data symbol based on the estimating.

Some examples of the method 800 and the apparatus described herein may further include operations, features, means, or instructions for using the set of coefficients to adjust the set of despread data symbols, where a set of adjusted data symbols may be obtained based on using the set of coefficients, where the combining includes.

In some examples of the method 800 and the apparatus described herein, despreading the set of spread data symbols may include operations, features, means, or instructions for applying a set of despreading codes to the set of spread data symbols.

Some examples of the method 800 and the apparatus described herein may further include operations, features, means, or instructions for decimating the set of despread data symbols, where the decimating includes, for each despread data symbol, filtering a set of frequencies from a respective despread data symbol and downsampling the respective despread data symbol after the filtering.

In some examples of the method 800 and the apparatus described herein, estimating the set of coefficients for the set of despread data symbols may include operations, features, means, or instructions for estimating a magnitude, phase, timing, frequency, or any combination thereof for the set of despread data symbols.

Some examples of the method 800 and the apparatus described herein may further include operations, features, means, or instructions for demodulating the combined data symbol to obtain a demodulated data symbol, and decoding the demodulated data symbol.

It should be noted that the methods described herein are possible implementations, and that the operations and the steps may be rearranged or otherwise modified and that other implementations are possible. Furthermore, portions from two or more of the methods may be combined. A system for satellite communications is described. The system may include a plurality of component spreaders, wherein each component spreader of the plurality of component spreaders is configured to apply a respective spreading code of a plurality of spreading codes to a common data symbol of a modulated signal to obtain a plurality of spread data symbols, and a plurality of antenna elements coupled with the plurality of component spreaders, wherein each antenna of the plurality of antenna elements is configured to obtain one or more spread data symbols of the plurality of spread data symbols and emit an element signal comprising the one or more spread data symbols, the composite signal comprising the signals emitted from the plurality of antenna elements.

The system may also include a receiver configured to receive the composite signal and comprising: a plurality of component despreaders, wherein each component despreader of the plurality of component despreaders is configured to apply a despreading code of a plurality of despreading codes to the composite signal to obtain a plurality of despread data symbols; a plurality of signal component estimators coupled with the plurality of component despreaders, wherein each signal component estimator of the plurality of signal component estimators is configured to estimate one or more coefficients for respective despread data symbols of the plurality of despread data symbols; and a combiner coupled with the plurality of signal component estimators, wherein the combiner is configured to combine the plurality of despread data symbols based at least in part on the one or more coefficients estimated for the plurality of despread data symbols to obtain a combined data symbol corresponding to the common data symbol.

The system may also include a plurality of decimators coupled with the plurality of component despreaders and the plurality of signal component estimators and configured to obtain a plurality of decimated data symbols, wherein each decimator of the plurality of decimators is configured to configured to filter and downsample a respective despread data symbol of the plurality of despread data symbols to obtain a decimated data symbol.

In some examples of the system, each signal component estimator of the plurality of signal component estimators is configured to estimate the one or more coefficients for the respective despread data symbols based at least in part on respective decimated data symbols of the plurality of decimated data symbols.

In some examples of the system, the receiver may include a demodulator that is coupled with the combiner, wherein the demodulator is configured to demodulate the combined data symbol to obtain a demodulated data symbol; and a decoder that is configured to decode a plurality of demodulated data symbols comprising the demodulated data symbol.

In some examples of the system, each antenna element of the plurality of antenna elements is configured to obtain a respective spread data symbol of the one or more spread data symbols.

In some examples, of the system, an antenna element of the plurality of antenna elements is configured to obtain a two or more of the plurality of spread data symbols.

In some examples of the system, two or more of the plurality of antenna elements are configured to obtain a spread data symbol from one of the plurality of component spreaders.

In some examples of the system, the one or more coefficients comprises magnitude, phase, timing, frequency, or any combination thereof.

In some examples of the system, the modulated signal is a first modulated signal and the transmitter further includes a beamformer configured to apply beamforming coefficients to a second modulated signal to obtain a plurality of beamformed data symbols; and a communications manager that is configured to switch between a first mode for transmitting the plurality of beamformed data symbols via the plurality of antenna elements for communication via beamformed spot beams and a second mode that causes the first modulated signal to bypass the beamformer.

In some examples of the system, the communications manager is configured to activate the first mode for a first interval of a period and the second mode for a second interval of the period that is smaller than the first interval.

In some examples of the system, the transmitter includes a modulator coupled with the plurality of component spreaders, the modulator configured to generate a plurality of data symbols comprising the common data symbol.

The system may also include a satellite comprising the plurality of antenna elements, and a gateway communicatively coupled with the satellite, wherein the gateway comprises the plurality of component spreaders.

The system may also include a satellite that comprises the plurality of component spreaders and the plurality of antenna elements of the transmitter.

The system may also include a plurality of gateways, wherein the transmitter comprises the plurality of gateways, each gateway of the plurality of gateways comprising a respective component spreader of the plurality of component spreaders and a respective antenna element of the plurality of antenna elements; and a satellite comprising a plurality of transponders configured to relay the composite signal.

An apparatus for satellite communications is described. The apparatus may include a set of component despreaders configured to receive a set of spread data symbols associated with a common data symbol and despread the set of spread data symbols to obtain a set of despread data symbols, a set of signal component estimators coupled with the set of component despreaders and configured to estimate one or more coefficients of the set of despread data symbols, and a combiner coupled with the set of signal component estimators and configured to combine the set of despread data symbols to obtain a combined data symbol corresponding to the common data symbol.

Some examples of the apparatus may include a set of decimators configured to apply a low-pass filter to and downsample the set of despread data symbols.

Some examples of the apparatus may include a demodulator configured to demodulate the combined data symbol to obtain a demodulated data symbol, and a decoder configured to decode the demodulated data symbol.

An apparatus for satellite communications is described. The apparatus may include a communications manager configured to switch from a first mode for transmitting beam signals via beamformed spot beams over the geographic area to a second mode that bypasses a beamformer used to form the spot beams, a modulator configured to generate a modulated signal including data for one or more user terminals based on switching to the second mode, the modulated signal including a set of modulated data symbols, a set of component spreaders coupled with the modulator and configured to apply a set of spreading codes to a modulated data symbol of the set of modulated data symbols to obtain a set of spread data symbols, and a set of antenna elements coupled with the set of component spreaders and configured to transmit each spread data symbol of the set of spread data symbols using one or more antenna elements of the set of antenna elements.

Some examples of the apparatus may include a data buffer coupled with the modulator and configured to receive data for a user terminal having an unknown location within a geographic area, where the data included in the modulated signal includes the data for the user terminal.

Some examples of the apparatus may include a data buffer coupled with the modulator and configured to receive second data for a user terminal having a known location within the geographic area, where the second data included in the modulated signal includes the data for the user terminal, where.

Some examples of the apparatus may include a set of beamformers coupled with the modulator configured to apply a set of beam weights to a second modulated data symbol of the second set of modulated data symbols to obtain a set of weighted data symbols, where the set of antenna elements may be configured to transmit a respected weighted data symbol of the set of spread data symbols.

Some examples of the apparatus may include a set of amplifiers coupled with the set of component spreaders and the set of antenna elements and configured to amplify the set of spread data symbols.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read-only memory (EEPROM), flash memory, compact disk read-only memory (CDROM) or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A system for satellite communications, comprising:
   a transmitter configured to transmit a composite signal and comprising:
      a plurality of component spreaders, wherein each component spreader of the plurality of component spreaders is configured to apply a respective spreading code of a plurality of spreading codes to a common data symbol of a modulated signal to obtain a plurality of spread data symbols, and
      a plurality of antenna elements coupled with the plurality of component spreaders, wherein each antenna of the plurality of antenna elements is configured to obtain one or more spread data symbols of the plurality of spread data symbols and emit an element signal comprising the one or more spread data symbols, the composite signal comprising the element signals emitted from the plurality of antenna elements; and
   a receiver configured to receive the composite signal and comprising:
      a plurality of component despreaders, wherein each component despreader of the plurality of component despreaders is configured to apply a despreading code of a plurality of despreading codes to the composite signal to obtain a plurality of despread data symbols,
      a plurality of signal component estimators coupled with the plurality of component despreaders, wherein each signal component estimator of the plurality of signal component estimators is configured to estimate one or more coefficients for respective despread data symbols of the plurality of despread data symbols, and
      a summing circuit coupled with the plurality of signal component estimators, wherein the summing circuit is configured to combine the plurality of despread data symbols based at least in part on the one or more coefficients estimated for the plurality of despread data symbols to obtain a combined data symbol corresponding to the common data symbol.

2. The system of claim 1, wherein the receiver further comprises:
   a plurality of decimators coupled with the plurality of component despreaders and the plurality of signal component estimators and configured to obtain a plurality of decimated data symbols, wherein each decimator of the plurality of decimators is configured to configured to filter and downsample a respective despread data symbol of the plurality of despread data symbols to obtain a decimated data symbol.

3. The system of claim 2, wherein each signal component estimator of the plurality of signal component estimators is configured to estimate the one or more coefficients for the respective despread data symbols based at least in part on respective decimated data symbols of the plurality of decimated data symbols.

4. The system of claim 1, wherein the receiver further comprises:
   a demodulator that is coupled with the summing circuit, wherein the demodulator is configured to demodulate the combined data symbol to obtain a demodulated data symbol; and
   a decoder that is configured to decode a plurality of demodulated data symbols comprising the demodulated data symbol.

5. The system of claim 1, wherein each antenna element of the plurality of antenna elements is configured to obtain a respective spread data symbol of the one or more spread data symbols.

6. The system of claim 1, wherein an antenna element of the plurality of antenna elements is configured to obtain two or more of the plurality of spread data symbols.

7. The system of claim 1, wherein two or more of the plurality of antenna elements are configured to obtain a spread data symbol from one of the plurality of component spreaders.

8. The system of claim 1, wherein the plurality of despreading codes is the same as the plurality of spreading codes.

9. The system of claim 1, wherein the one or more coefficients comprises magnitude, phase, timing, frequency, or any combination thereof.

10. The system of claim 1, wherein the modulated signal is a first modulated signal, and wherein the transmitter further comprises:
a beamformer configured to apply beamforming coefficients to a second modulated signal to obtain a plurality of beamformed data symbols; and
a communications manager that is configured to switch between a first mode for transmitting the plurality of beamformed data symbols via the plurality of antenna elements for communication via beamformed spot beams and a second mode that causes the first modulated signal to bypass the beamformer.

11. The system of claim 10, wherein the communications manager is further configured to:
activate the first mode for a first interval of a period and the second mode for a second interval of the period that is smaller than the first interval.

12. The system of claim 1, wherein the transmitter further comprises:
a modulator coupled with the plurality of component spreaders, the modulator configured to generate a plurality of data symbols comprising the common data symbol.

13. The system of claim 1, further comprising:
a satellite comprising the plurality of antenna elements, and
a gateway communicatively coupled with the satellite, wherein the gateway comprises the plurality of component spreaders.

14. The system of claim 1, further comprising:
a satellite that comprises the plurality of component spreaders and the plurality of antenna elements of the transmitter.

15. The system of claim 1, further comprising:
a plurality of gateways, wherein the transmitter comprises the plurality of gateways, each gateway of the plurality of gateways comprising a respective component spreader of the plurality of component spreaders and a respective antenna element of the plurality of antenna elements; and
a satellite comprising a plurality of transponders configured to relay the composite signal.

16. A method for satellite communications, comprising:
receiving a composite signal comprising a plurality of spread data symbols associated with a common data symbol;
despreading the plurality of spread data symbols to obtain a plurality of despread data symbols;
estimating a plurality of coefficients for the plurality of despread data symbols; and
combining the plurality of despread data symbols to obtain a combined data symbol corresponding to the common data symbol based at least in part on the estimating.

17. The method of claim 16, further comprising:
using the plurality of coefficients to adjust the plurality of despread data symbols, wherein a plurality of adjusted data symbols are obtained based at least in part on using the plurality of coefficients, wherein the combining comprises:
combining the plurality of adjusted data symbols to obtain the combined data symbol.

18. The method of claim 16, wherein despreading the plurality of spread data symbols comprises:
applying a plurality of despreading codes to the plurality of spread data symbols.

19. The method of claim 16, further comprising:
decimating the plurality of despread data symbols, wherein the decimating comprises, for each despread data symbol, filtering a set of frequencies from a respective despread data symbol and downsampling the respective despread data symbol after the filtering.

20. The method of claim 16, wherein estimating the plurality of coefficients for the plurality of despread data symbols comprises:
estimating a magnitude, phase, timing, frequency, or any combination thereof for the plurality of despread data symbols.

21. The method of claim 16, further comprising:
demodulating the combined data symbol to obtain a demodulated data symbol; and
decoding the demodulated data symbol.

22. An apparatus for satellite communications, comprising:
a plurality of component despreaders configured to receive a plurality of spread data symbols associated with a common data symbol and despread the plurality of spread data symbols to obtain a plurality of despread data symbols;
a plurality of signal component estimators coupled with the plurality of component despreaders and configured to estimate one or more coefficients of the plurality of despread data symbols; and
a summing circuit coupled with the plurality of signal component estimators and configured to combine the plurality of despread data symbols to obtain a combined data symbol corresponding to the common data symbol.

23. The apparatus of claim 22, further comprising:
a plurality of decimators configured to apply a low-pass filter to and downsample the plurality of despread data symbols.

24. The apparatus of claim 22, further comprising:
a demodulator configured to demodulate the combined data symbol to obtain a demodulated data symbol; and
a decoder configured to decode the demodulated data symbol.

* * * * *